US011352053B2

(12) United States Patent
Sakaguchi et al.

(10) Patent No.: US 11,352,053 B2
(45) Date of Patent: *Jun. 7, 2022

(54) TURNING CONTROL DEVICE

(71) Applicant: NSK LTD., Tokyo (JP)

(72) Inventors: Toru Sakaguchi, Fujisawa (JP);
Tetsuya Kitazume, Maebashi (JP);
Shoya Maruyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/287,778

(22) PCT Filed: Oct. 21, 2020

(86) PCT No.: PCT/JP2020/039576
§ 371 (c)(1),
(2) Date: Apr. 22, 2021

(87) PCT Pub. No.: WO2021/106437
PCT Pub. Date: Jun. 3, 2021

(65) Prior Publication Data
US 2022/0041210 A1    Feb. 10, 2022

(30) Foreign Application Priority Data
Nov. 26, 2019  (JP) .............................. JP2019-213625

(51) Int. Cl.
*B62D 6/00* (2006.01)
*B62D 15/02* (2006.01)
*B62D 5/04* (2006.01)

(52) U.S. Cl.
CPC ........... *B62D 6/002* (2013.01); *B62D 5/0481* (2013.01); *B62D 15/0215* (2013.01); *B62D 6/008* (2013.01)

(58) Field of Classification Search
CPC ...... B62D 6/002; B62D 5/0481; B62D 6/008; B62D 15/0215
See application file for complete search history.

(56) References Cited

U.S. PATENT DOCUMENTS

2004/0104066 A1    6/2004  Sakai
2009/0105907 A1*   4/2009  Yamaguchi ............ B62D 6/002
                                              701/41

(Continued)

FOREIGN PATENT DOCUMENTS

JP    2004-130971 A    4/2004
JP    2013-237397 A    11/2013

(Continued)

OTHER PUBLICATIONS

International Search Report of PCT/JP2020/039576 dated Dec. 28, 2020 [PCT/ISA/210].

(Continued)

*Primary Examiner* — Jason Holloway
(74) *Attorney, Agent, or Firm* — Sughrue Mion, PLLC

(57) ABSTRACT

A turning control device includes: a target steering angle calculation unit configured to calculate a target steering angle of a turning mechanism, based on a second steering angle of a steering mechanism; a steering angular displacement calculation unit configured to, when a third steering angle, the third steering angle being either a first steering angle of the turning mechanism or the second steering angle, is in a range from a maximum steering angle that the third steering angle can take to a first threshold steering angle, calculate a steering angular displacement of the third steering angle with the first threshold steering angle used as a reference; a steering angle correction value calculation unit configured to calculate a steering angle correction value according to at least the steering angular displacement; and (Continued)

a corrected target steering angle calculation unit configured to correct the target steering angle with the steering angle correction value.

13 Claims, 22 Drawing Sheets

(56) References Cited

U.S. PATENT DOCUMENTS

| | | | | |
|---|---|---|---|---|
| 2011/0077834 | A1* | 3/2011 | Kudo | B60T 8/1764 |
| | | | | 701/72 |
| 2014/0343791 | A1* | 11/2014 | Suzuki | B62D 5/0487 |
| | | | | 701/41 |
| 2017/0096163 | A1* | 4/2017 | Sakaguchi | B62D 6/02 |
| 2019/0351936 | A1 | 11/2019 | Anraku et al. | |
| 2020/0010112 | A1 | 1/2020 | Toko et al. | |

FOREIGN PATENT DOCUMENTS

| | | |
|---|---|---|
| JP | 2014-133533 A | 7/2014 |
| JP | 2019-199172 A | 11/2019 |
| JP | 2020-006831 A | 1/2020 |
| WO | 2013/094097 A1 | 6/2013 |
| WO | 2014/038133 A1 | 3/2014 |
| WO | 2014/054253 A1 | 4/2014 |
| WO | 2019/193976 A1 | 10/2019 |

OTHER PUBLICATIONS

Written Opinion of PCT/JP2020/039576 dated Dec. 28, 2020 [PCT/ISA/237].

* cited by examiner

TURNING CONTROL DEVICE

CROSS REFERENCE TO RELATED APPLICATIONS

This application is a National Stage of International Application No. PCT/JP2020/039576, filed Oct. 21, 2020, claiming priority to Japanese Patent Application No. 2019-213625, filed Nov. 26, 2019.

TECHNICAL FIELD

The present invention relates to a turning control device.

BACKGROUND ART

In a turning mechanism of a vehicle, when a turning angle increases and reaches a mechanical maximum turning angle, the rack shaft of the turning mechanism reaches a stroke end and it becomes impossible to increase the turning angle any further. The rack shaft being brought to a state of having reached a stroke end as described above is referred to as "end-abutting". When end-abutting occurs at high turning velocity, there is a possibility that large impact and hit sound (abnormal noise) are generated and the driver feels uncomfortable.

In PTL 1, a technology for suppressing increase in the turning angle around the maximum turning angle in a system (such as a steer by wire system) controlling the turning angle of a turning mechanism, based on a target turning angle is described.

The technology described in PTL 1 rapidly generates steering reaction force that returns the steering wheel to the neutral point side near the upper limit and the lower limit of a turning range of the turning mechanism. When such steering reaction force is applied, the driver is urged not to steer the steering wheel in a direction in which the turning angle changes toward a maximum turning angle, as a result of which occurrence of end-abutting is suppressed.

CITATION LIST

Patent Literature

PTL 1: JP 2004-130971 A

SUMMARY OF INVENTION

Technical Problem

However, even if such a steering reaction force is provided, if the driver steers against the steering reaction force, the end-abutting may occur, and the impact and hit sound (abnormal noise) at the time of collision may not be effectively suppressed.

The present invention has been made focusing on the above problem, and it is an object of the present invention to suppress an impact and hit sound (abnormal noise) due to the end-abutting in a system controlling a turning angle of a turning mechanism, based on a target turning angle.

Solution to Problem

In order to achieve the above-described object, a turning control device according to one aspect of the present invention includes a first steering angle detection unit configured to detect a first steering angle of a turning mechanism, a first actuator configured to drive the turning mechanism, a second steering angle detection unit configured to detect a second steering angle of a steering mechanism, a target steering angle calculation unit configured to calculate a target steering angle of the turning mechanism, based on at least the second steering angle, a steering angular displacement calculation unit configured to, when a third steering angle, the third steering angle being either the first steering angle or the second steering angle, is in an angular range from a maximum steering angle that the third steering angle can take to a first threshold steering angle, calculate a steering angular displacement of the third steering angle with the first threshold steering angle used as a reference, a steering angle correction value calculation unit configured to calculate a steering angle correction value according to at least the steering angular displacement, a corrected target steering angle calculation unit configured to, by correcting the target steering angle with the steering angle correction value, calculate a corrected target steering angle, and a steering angle control unit configured to control the first actuator in such a way that the first steering angle coincides with the corrected target steering angle.

Advantageous Effects of Invention

According to the present invention, it is possible to suppress an impact and hit sound (abnormal noise) due to the end-abutting in a system controlling a turning angle of a turning mechanism, based on a target turning angle.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
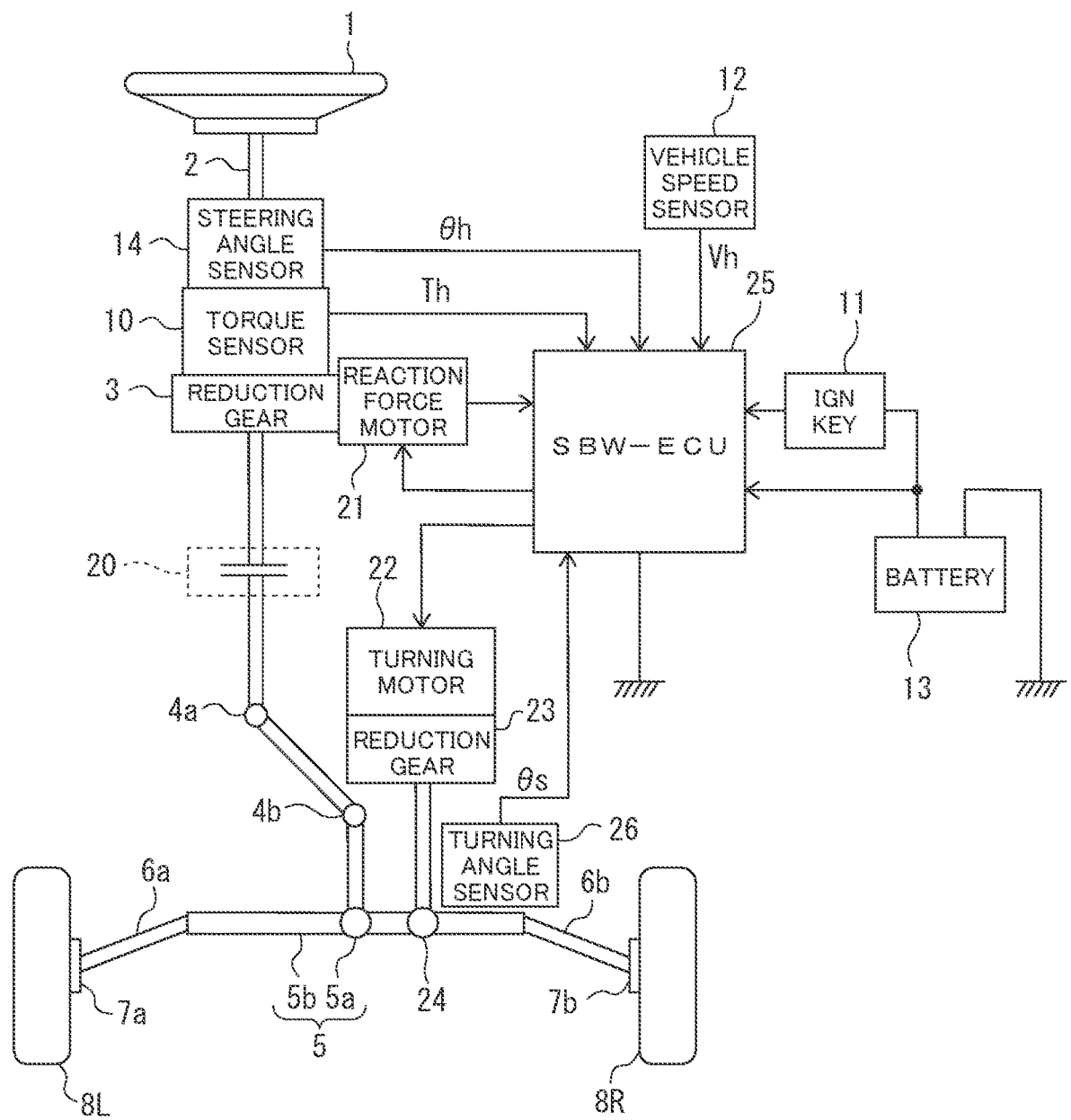
FIG. 1 is a configuration diagram illustrative of an outline of an example of a turning device of embodiments.

The present invention is applied to a turning device that controls a turning angle of a turning mechanism (that is, a turning angle of turning wheels), based on a target turning angle. FIG. 1 illustrates, as an example of such a turning device, a turning device that includes a steer by wire (SBW) mechanism in which a steering mechanism and a turning mechanism are mechanically separated from each other. However, the present invention is not limited to a turning device including a steer by wire mechanism, and the present invention is widely applicable to a variety of turning devices as long as the turning device is a turning device that controls a turning angle of a turning mechanism, based on a target turning angle.

A steering shaft (steering wheel shaft) 2 of a steering wheel 1 is connected to steered wheels 8L and 8R by way of a reduction gear (worm gear) 3 that constitutes a speed reduction mechanism, a backup clutch 20, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b. To the rack 5b, a turning angle sensor 26 that detects a movement amount of the rack 5b and thereby detects a turning angle θs of the steered wheels 8L and 8R is disposed.

To the steering shaft 2, a torque sensor 10 that detects reaction torque Th is disposed. To the steering shaft 2, a steering angle sensor 14 that detects a steering angle θh of the steering wheel 1 or the steering shaft 2 is also disposed.

A reaction force motor 21 that applies reaction torque Th to the steering wheel 1 is connected to the steering shaft 2 via the reduction gear 3.

Note that the steering angle sensor 14 and the turning angle sensor 26 are not essential components and the steering angle θh and the turning angle θs may be acquired based on a motor rotation angle detected by a rotation angle sensor, such as a resolver, connected to the reaction force motor 21 or the turning motor 22.

The turning motor 22, which turns the steered wheels 8L and 8R, is connected to a pinion 24 via a reduction gear 23, and the pinion 24 meshes with the rack 5b. This configuration causes rotational motion of the turning motor 22 to be converted to linear motion in the vehicle width direction of the rack 5b.

Note that a means for applying the reaction torque Th to the steering wheel 1 and a means for turning the steered wheels 8L and 8R are not limited to an electric motor and a variety of types of actuators can be used.

The backup clutch 20 mechanically separates the steering wheel 1 and the steered wheels 8L and 8R from each other when brought to a released state and mechanically connects the steering wheel 1 and the steered wheels 8L and 8R to each other when brought to an engaged state. In other words, the backup clutch 20 mechanically separates the steering mechanism and the turning mechanism from each other when brought to the released state and mechanically connects the steering mechanism and the turning mechanism to each other when brought to the engaged state.

In the following description, the turning angle θs of the turning mechanism (that is, the turning angle θs of the steered wheels 8L and 8R) and the steering angle θh of the steering mechanism (that is, the steering angle θh of the steering wheel 1) are sometimes referred to as a first steering angle θs and a second steering angle θh, respectively.

To a steer by wire-electronic control unit (SBW-ECU) 25 configured to control a steer by wire mechanism, power is supplied from a battery 13 and, in conjunction therewith, an ignition key signal is input via an ignition (IGN) key 11.

The SBW-ECU 25 performs calculation of a current command value of a turning control command, based on vehicle speed Vh detected by a vehicle speed sensor 12, the second steering angle θh detected by the steering angle sensor 14, and the first steering angle θs detected by the turning angle sensor 26 and controls current supplied to the turning motor 22, based on a voltage control command value obtained by applying compensation and the like to the current command value.

The SBW-ECU 25 also calculates a target reaction torque Thr, based on the vehicle speed Vh detected by the vehicle speed sensor 12 and the second steering angle θh detected by the steering angle sensor 14 and performs feedback control to bring the reaction torque Th detected by the torque sensor 10 close to the target reaction torque Thr.

The SBW-ECU 25 may include, for example, a computer including at least one processor and peripheral components, such as a storage device. The processor may be, for example, a CPU or an MPU.

The storage device may include any of a semiconductor storage device, a magnetic storage device, and an optical storage device. The storage device may include registers, a cache memory or, a memory, such as a ROM and a RAM, that are used as a main storage device.

Functions of the SBW-ECU 25 that will be described below are achieved by, for example, the processor of the SBW-ECU 25 executing computer programs stored in the storage device.

Note that the SBW-ECU 25 may be formed using dedicated hardware for performing respective parts of information processing, which will be described below.

For example, the SBW-ECU 25 may include functional logic circuits that are set in a general-purpose semiconductor integrated circuit. For example, the SBW-ECU 25 may have a programmable logic device, such as a field programmable gate array.

Figure 2:
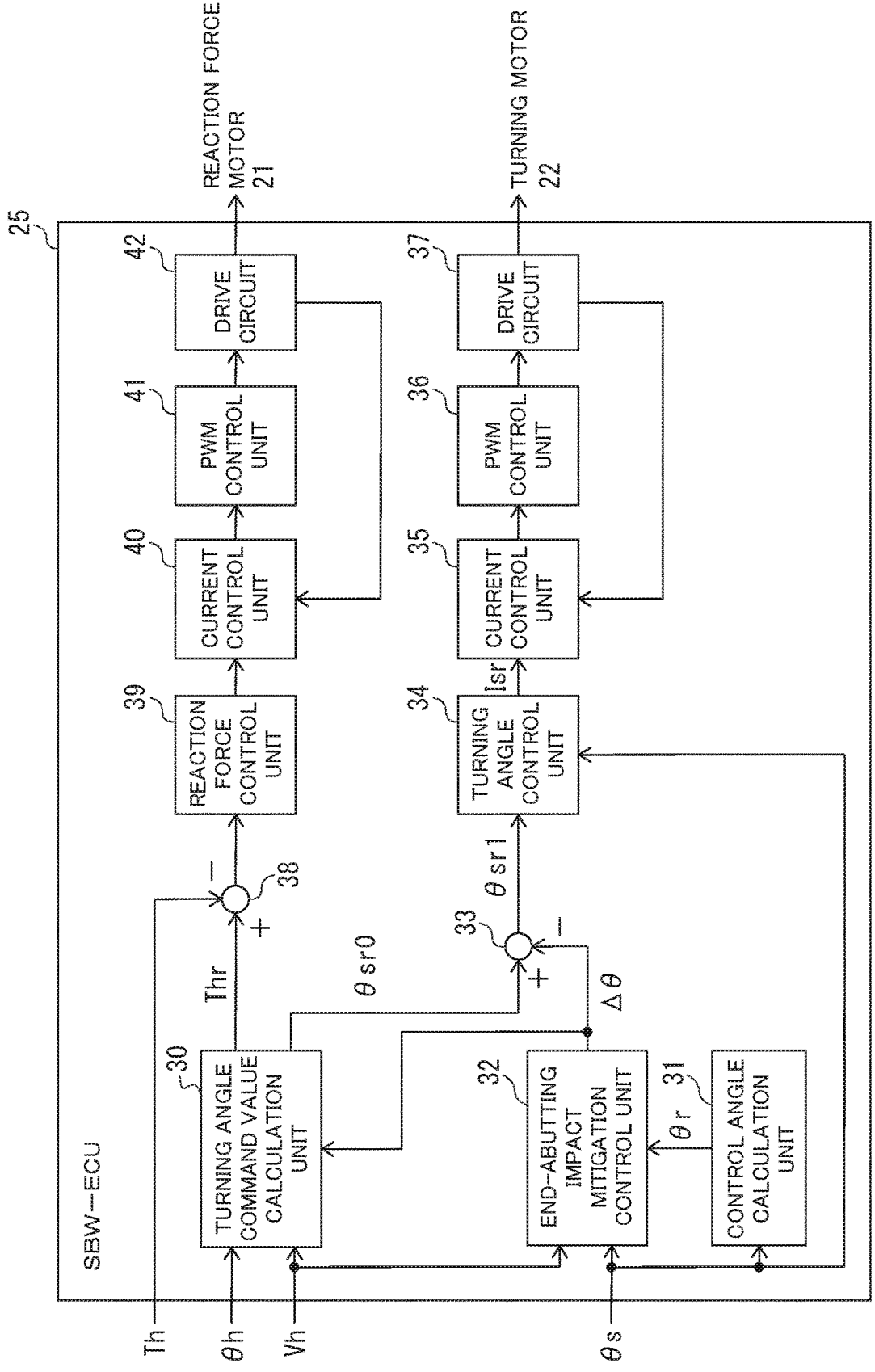
FIG. 2 is a block diagram illustrative of an example of a functional configuration of a steer by wire-electronic control unit (SBW-ECU) of a first embodiment.

With reference to FIG. 2, an example of a functional configuration of the SBW-ECU 25 of the first embodiment will be described. The SBW-ECU 25 includes a turning angle command value calculation unit 30, a control angle calculation unit 31, an end-abutting impact mitigation control unit 32, subtracters 33 and 38, a turning angle control unit 34, current control units 35 and 40, pulse width modulation (PWM) control units 36 and 41, drive circuits 37 and 42 that are inverters or the like, and a reaction force control unit 39.

The turning angle command value calculation unit 30 calculates a target steering angle θsr0 of the first steering angle θs of the turning mechanism, based on at least the second steering angle θh. In the present example, the turning angle command value calculation unit 30 calculates the target steering angle θsr0, based on the second steering angle θh and the vehicle speed Vh. The turning angle command value calculation unit 30 also calculates a target reaction torque Thr that is applied to the steering mechanism, based on at least the second steering angle θh. Details of the turning angle command value calculation unit 30 will be described later.

The control angle calculation unit 31 and the end-abutting impact mitigation control unit 32 perform end-abutting impact mitigation control for mitigating impact at the time of end-abutting.

In the end-abutting impact mitigation control, when the first steering angle θs is within an angular range from a predetermined first threshold steering angle to a maximum steering angle, the target steering angle θsr0 is corrected to decrease and impact at the time of end-abutting is thereby mitigated.

The control angle calculation unit 31 calculates a control angle θr that is used for the end-abutting impact mitigation control.

Figure 3:
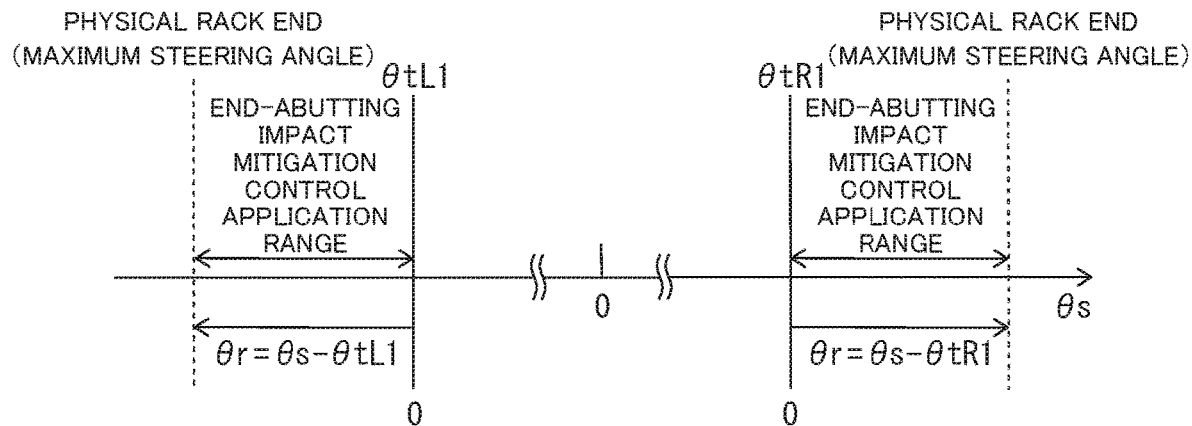
FIG. 3 is an explanatory diagram of an operation example of a control angle calculation unit.

FIG. 3 is now referred to. The sign is defined in such a way that the first steering angle θs has a positive value when the steered wheels 8L and 8R are turned to the right and the first steering angle θs has a negative value when the steered wheels 8L and 8R are turned to the left.

The end-abutting impact mitigation control is performed when the first steering angle θs is in a range from a positive first threshold steering angle θtR1 to a positive maximum steering angle and when the first steering angle θs is in a range from a negative first threshold steering angle θtL1 to a negative maximum steering angle.

The control angle calculation unit 31 calculates a steering angular displacement of the first steering angle θs with the first threshold steering angle θtR1 used as a reference as a control angle θr when the first steering angle θs is in the range from the first threshold steering angle θtR1 to the positive maximum steering angle. For example, the control angle calculation unit 31 calculates a difference (θs−θtR1) between the first steering angle θs and the first threshold steering angle θtR1 as a control angle θr.

The control angle calculation unit 31 calculates a steering angular displacement of the first steering angle θs with the first threshold steering angle θtL1 used as a reference as a control angle θr when the first steering angle θs is in the range from the first threshold steering angle θtL1 to the negative maximum steering angle. For example, the control angle calculation unit 31 calculates a difference (θs−θtL1) between the first steering angle θs and the first threshold steering angle θtL1 as a control angle θr.

The control angle calculation unit 31 sets the control angle θr at 0 when the first steering angle θs is in a range of the negative first threshold steering angle θtL1 or more and the positive first threshold steering angle θtR1 or less.

FIG. 2 is now referred to. The end-abutting impact mitigation control unit 32 calculates a steering angle correction value Δθ for correcting the target steering angle θsr0 in the end-abutting impact mitigation, based on the control angle θr and angular velocity ω of the first steering angle θs. Details of the end-abutting impact mitigation control unit 32 will be described later.

The turning angle command value calculation unit 30 corrects the target reaction torque Thr according to the steering angle correction value Δθ.

The subtracter 33 corrects the target steering angle θsr0 by subtracting the steering angle correction value Δθ from the target steering angle θsr0, which the turning angle command value calculation unit 30 calculated, and obtains a corrected target steering angle θsr1.

The turning angle control unit 34 generates a current command value Isr, based on deviation between the corrected target steering angle θsr1 and an actual first steering angle θs.

The current control unit 35 generates a voltage control command value, based on deviation between the current command value Isr and a fed-back motor current value of the turning motor 22. The PWM control unit 36 controls the drive circuit 37, based on the voltage control command value generated by the current control unit 35 and thereby PWM-drives the turning motor 22.

On the other hand, the target reaction torque Thr calculated by the turning angle command value calculation unit 30 is input to the subtracter 38, and the subtracter 38 calculates a torque deviation that is obtained by subtracting the reaction torque Th, which is detected by the torque sensor 10, from the target reaction torque Thr. The reaction force control unit 39 generates a current command value, based on the torque deviation calculated by the subtracter 38.

The current control unit 40 generates a voltage control command value, based on deviation between the current command value calculated by the reaction force control unit 39 and a fed-back motor current value of the reaction force motor 21. The PWM control unit 41 controls the drive circuit 42, based on the voltage control command value generated by the current control unit 40 and thereby PWM-drives the reaction force motor 21.

Next, the turning angle command value calculation unit 30 will be described.

Figure 4:
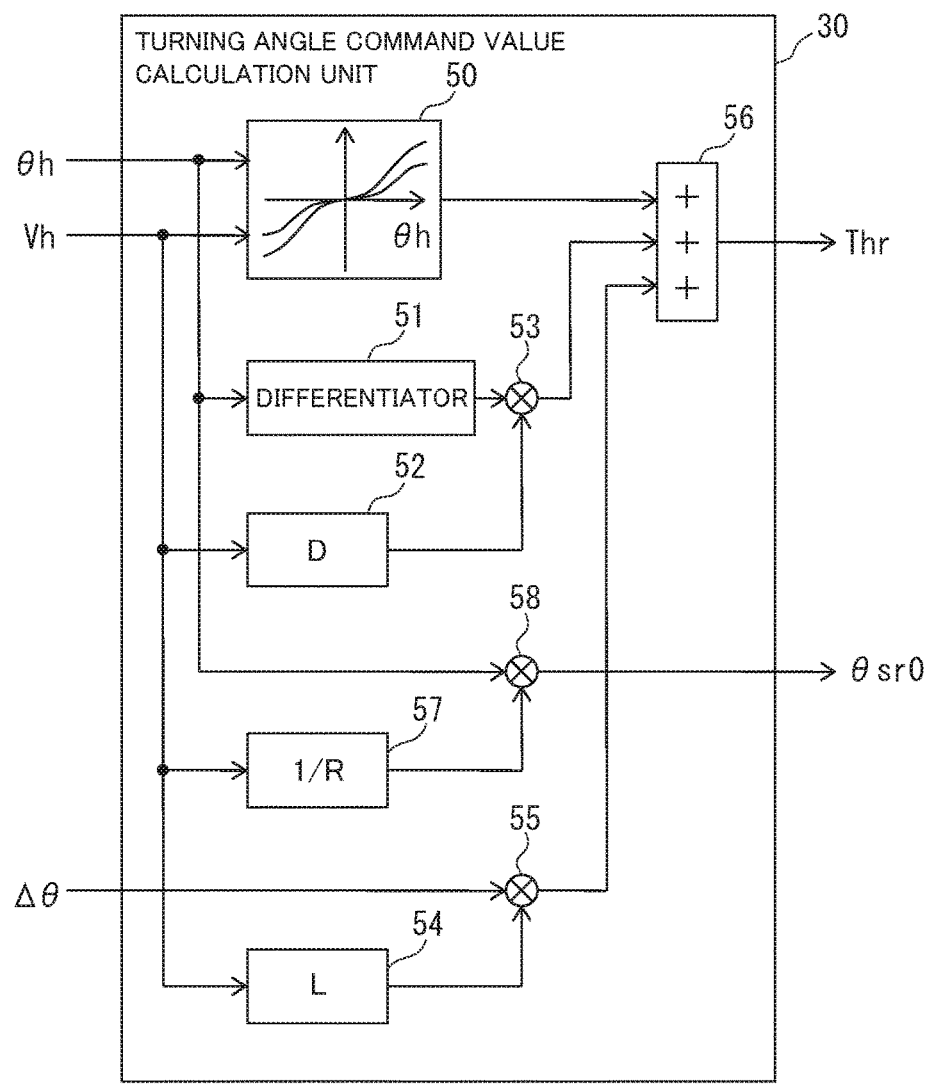
FIG. 4 is a block diagram illustrative of an example of a functional configuration of a turning angle command value calculation unit.

FIG. 4 is now referred to. The turning angle command value calculation unit 30 includes a base reaction torque calculation unit 50, a differentiator 51, a damping coefficient table 52, multipliers 53, 55, and 58, a reaction force correction coefficient table 54, an adder 56, and a turning ratio table 57.

The base reaction force torque calculation unit 50 calculates a base reaction torque, based on the second steering angle θh and the vehicle speed Vh. The base reaction torque is input to the adder 56.

The differentiator 51 differentiates the second steering angle θh and thereby calculates a steering velocity dθh/dt. The damping coefficient table 52 outputs a damping coefficient (viscosity coefficient) D depending on the vehicle speed Vh to the multiplier 53. The multiplier 53 multiplies the steering velocity dθh/dt by the damping coefficient D and thereby calculates a viscous torque component.

The turning ratio table 57 outputs a turning ratio 1/R depending on the vehicle speed Vh to the multiplier 58. The multiplier 58 multiplies the turning ratio 1/R by the second steering angle θh and thereby calculates a target steering angle θsr0. Therefore, the target steering angle θsr0 increases according to increase in the second steering angle θh.

The reaction force correction coefficient table 54 outputs a reaction force correction coefficient L depending on the vehicle speed Vh to the multiplier 55.

The multiplier 55 multiplies the steering angle correction value Δθ by the reaction force correction coefficient L and thereby calculates a correction torque component. The adder 56 adds the viscous torque component and the correction torque component to the base reaction torque and thereby calculates a target reaction torque Thr. This calculation causes the target reaction torque Thr to be corrected according to the steering angle correction value Δθ.

As described above, the steering angle correction value Δθ has a nonzero value when the end-abutting impact mitigation control is performed. Thus, the reaction torque increases when the end-abutting impact mitigation control is performed, and the second steering angle θh is thereby suppressed from increasing. In addition, notifying the driver of the rack 5b coming close to a stroke end enables the second steering angle θh to be suppressed from increasing.

As a result, it is possible to suppress the target steering angle θsr0 from increasing in directions toward the maximum steering angles and effectively generate virtual stroke ends of the rack 5b.

Because of this configuration, setting the reaction force correction coefficient L appropriately enables the virtual stroke ends to be generated and, at the same time, excessive steering reaction force to be prevented from being provided to the driver.

Note that the correction torque component may be calculated by multiplying, in place of the steering angle correction value Δθ, a difference (θsr0−θs) between the target steering angle θsr0 and the first steering angle θs by the reaction force correction coefficient L.

Next, the end-abutting impact mitigation control unit 32 will be described. The end-abutting impact mitigation control unit 32 calculates a turning torque Tm that is exerted in a direction in which the turning mechanism is returned to a neutral position and calculates a change amount Δθ of the first steering angle θs when the turning torque Tm acts on the turning mechanism as a steering angle correction value Δθ for correcting the target steering angle θsr0, when the end-abutting impact mitigation control is performed.

A conversion processing from the turning torque Tm to the steering angle correction value Δθ, which is performed by the end-abutting impact mitigation control unit 32, will be described below.

The steering angle correction value Δθ, which is an output from the end-abutting impact mitigation control unit 32, by correcting the target steering angle θsr0, acts on the turning mechanism as the turning torque Tm. When it is now assumed that characteristics of the turning mechanism, tires, and road surface reaction force are expressed by $1/(Js^2+Dms+Kb)$, the first steering angle θs of the turning mechanism is expressed by the formula (1) below.

[Math 1]

$$\theta s = \frac{Tm}{J \cdot s^2 + Dm \cdot s + Kb} \quad (1)$$

In the formula (1), J is column shaft inertia that is obtained by converting inertia of the turning motor 22, the turning mechanism, and the tires to inertia acting on the steering shaft 2, Dm is a converted value of viscosity coefficients of the turning motor 22, the turning mechanism, and the tires that is obtained by converting the viscosity coefficients to a viscosity coefficient of viscous resistance acting on the steering shaft 2, Kb is a spring constant of the sum of reaction force from the road surface and lifting torque, and s is a Laplace operator.

Change Δθ in the first steering angle θs when the turning torque Tm acts on the turning mechanism is expressed by the formula (2) below, using the final value theorem of the Laplace transform (steady-state value).

[Math 2]

$$\Delta\theta = \lim_{s \to 0} s \frac{Tm}{J \cdot s^2 + Dm \cdot s + Kb} \frac{1}{s} = \frac{Tm}{Kb} \quad (2)$$

Correcting the target steering angle θsr0 with this Δθ (that is, subtracting Δθ from the target steering angle θsr0) enables the target steering angle θsr0 to be corrected in such a way that the turning torque Tm acts on the turning mechanism in a direction in which the turning mechanism is returned to the neutral position.

When the turning torque Tm expressed by the formula (3) below is exerted on the turning mechanism, the steering angle correction value Δθ can be calculated by the formula (4) below. The end-abutting impact mitigation control unit 32 calculates the steering angle correction value Δθ in accordance with the formula (4) below.

[Math 3]

$$Tm = K0 \cdot \theta r + \mu \cdot \omega + \Delta J \cdot \alpha \qquad (3)$$

$$\Delta \theta = \frac{K0 \cdot \theta r + \mu \cdot \omega + \Delta J \cdot \alpha}{Kb} \qquad (4)$$

In the formula (4), K0 is a spring constant of an elastic torque component, μ is a viscosity coefficient of a viscous torque component, ω is angular velocity of the first steering angle θs, ΔJ is an inertia coefficient of an inertia torque component, and α is angular acceleration of the first steering angle θs.

Figure 5:
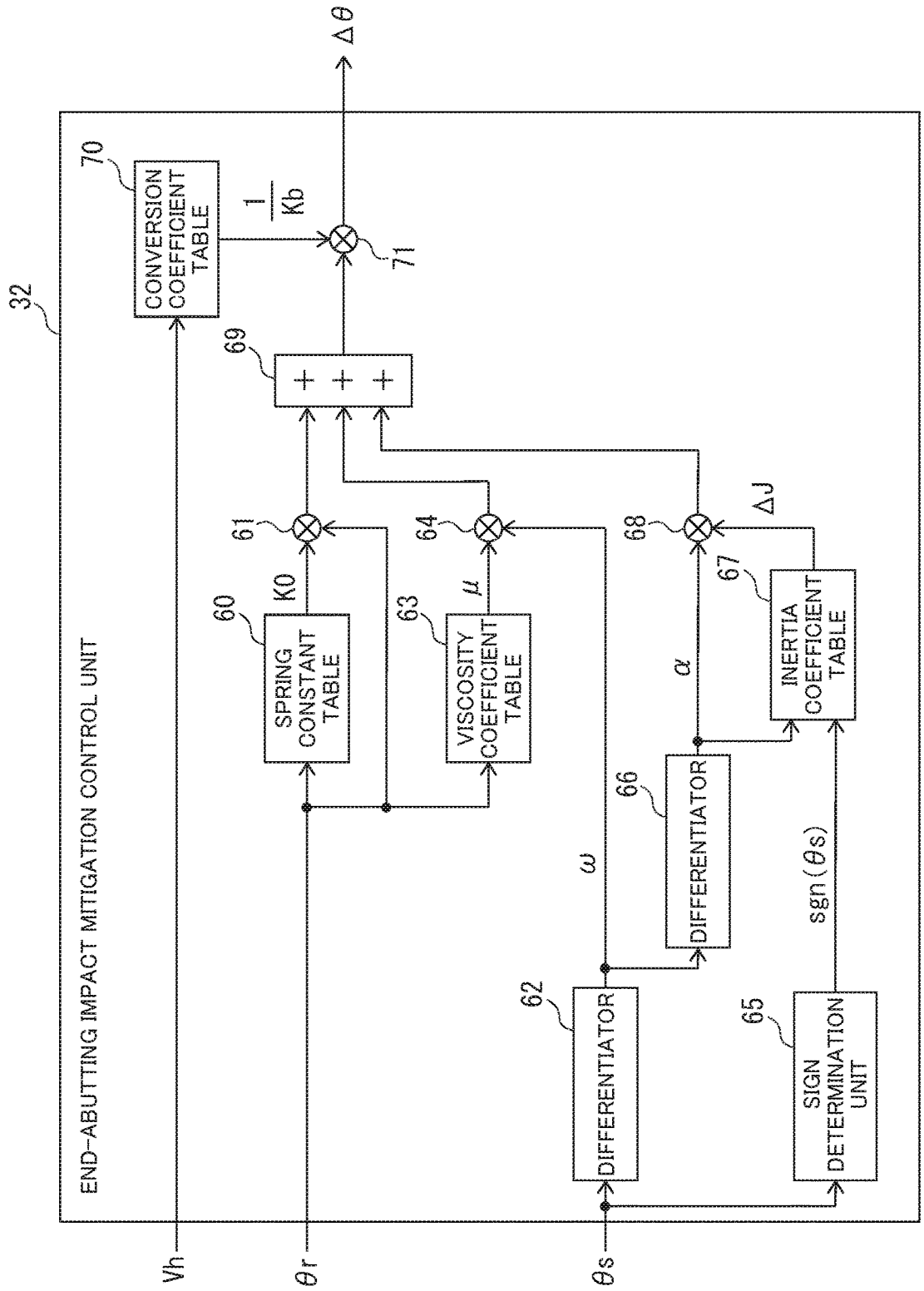
FIG. 5 is a block diagram illustrative of an example of a functional configuration of an end-abutting impact mitigation control unit of the first embodiment.

With reference to FIG. 5, a configuration of the end-abutting impact mitigation control unit 32 will be described below. The end-abutting impact mitigation control unit 32 includes a spring constant table 60, multipliers 61, 64, 68, and 71, differentiators 62 and 66, a viscosity coefficient table 63, a sign determination unit 65, an inertia coefficient table 67, an adder 69, and a conversion coefficient table 70.

The spring constant table 60 outputs a spring constant K0 depending on the control angle θr to the multiplier 61 as a spring constant of an elastic torque component of the turning torque Tm. The multiplier 61 multiplies the control angle θr by the spring constant K0 and thereby calculates an elastic torque component (K0·θr) of the turning torque Tm and outputs the calculated elastic torque component (K0·θr) to the adder 69.

Figure 6A:
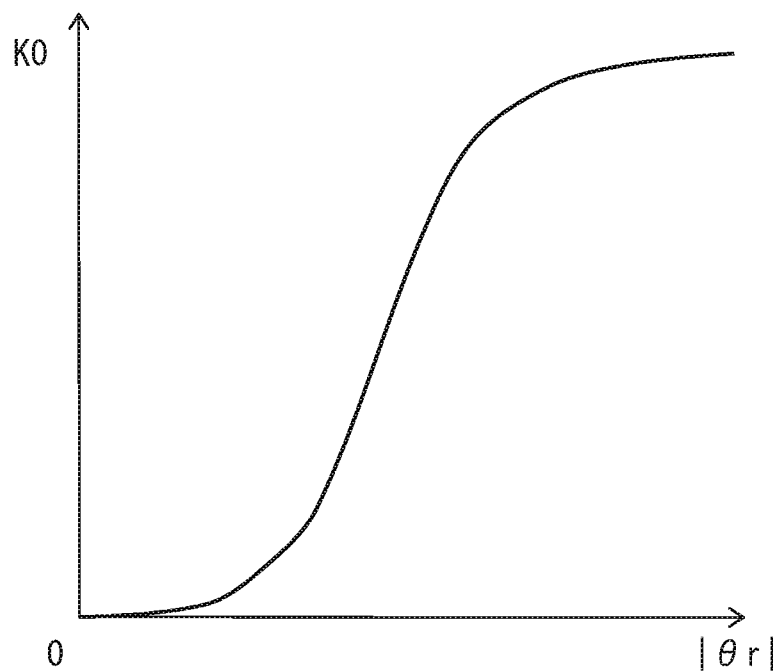
FIGS. 6A and 6B are a characteristic diagram of an example of a spring constant and a characteristic diagram of an example of a viscosity coefficient, respectively.
Figure 6B:
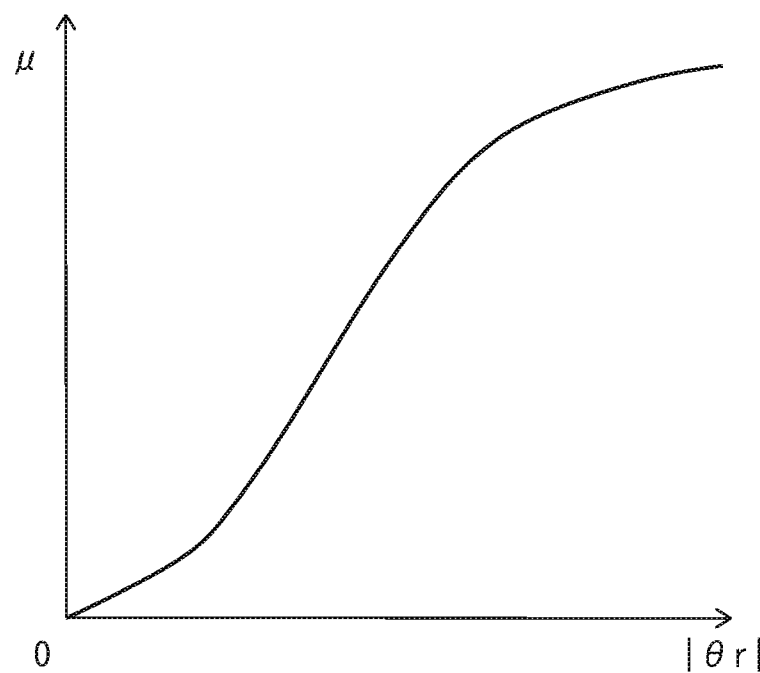

The differentiator 62 differentiates the first steering angle θs and thereby calculates an angular velocity ω of the first steering angle θs. The viscosity coefficient table 63 outputs a viscosity coefficient μ depending on the control angle θr to the multiplier 64 as a viscosity coefficient of a viscous torque component of the turning torque Tm. The multiplier 64 multiplies the angular velocity ω by the viscosity coefficient μ and thereby calculates a viscous torque component (μ·•) of the turning torque Tm and outputs the calculated viscous torque component (μ·ω) to the adder 69. FIGS. 6A and 6B are characteristic diagrams of examples of characteristics of the spring constant K0 and the viscosity coefficient μ, respectively.

The sign determination unit 65 determines a positive/negative sign of the first steering angle θs and outputs a sign sgn(θs) of the first steering angle θs. The differentiator 66 differentiates the angular velocity ω and thereby calculates an angular acceleration α of the first steering angle θs. The inertia coefficient table 67 outputs an inertia coefficient ΔJ depending on the angular acceleration α and the sign sgn(θs) to the multiplier 68 as an inertia coefficient of an inertia torque component of the turning torque Tm. The multiplier 68 multiplies the angular acceleration α by the inertia coefficient ΔJ and thereby calculates an inertia torque component (ΔJ·α) of the turning torque Tm and outputs the calculated inertia torque component (ΔJ·α) to the adder 69.

Performing correction based on the inertia of the turning mechanism, using the inertia torque component (ΔJ·α) enables inertia torque in acceleration and deceleration of the first steering angle θs to be adjusted.

Figure 7A:
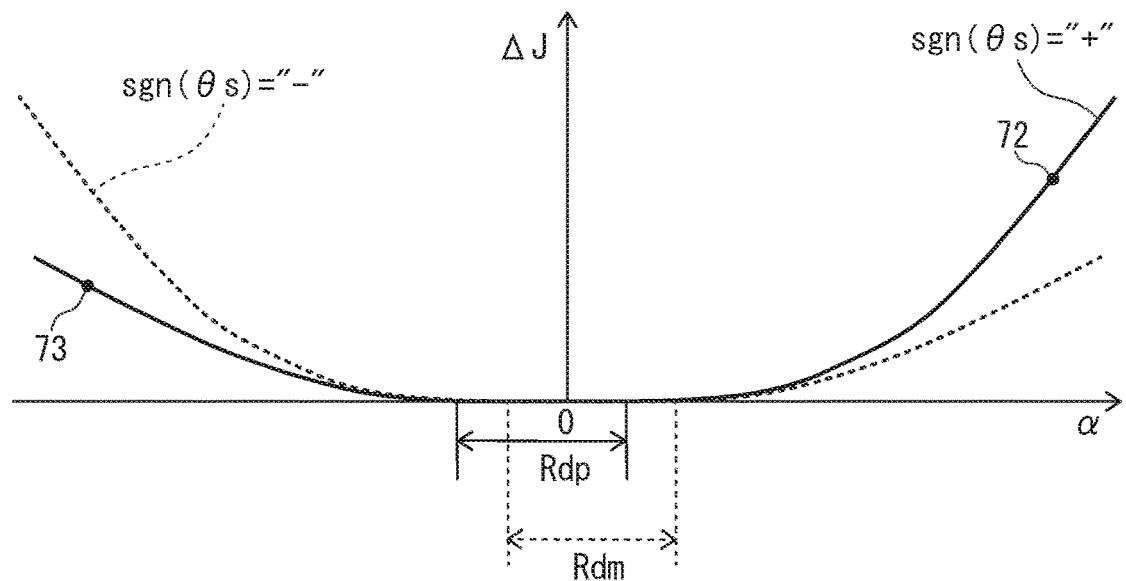
FIGS. 7A, 7B, and 7C are a characteristic diagram of an example of an inertia coefficient, a diagram illustrative of a setting example of an inertia coefficient in a low inertia system, and a diagram illustrative of a setting example of an inertia coefficient in a high inertia system, respectively.

FIG. 7A illustrates an example of characteristics of the inertia coefficient ΔJ. In FIG. 7A, a solid line illustrates the characteristics in the case where the sign sgn(θs) of the first steering angle θs is positive (+), and a dashed line illustrates the characteristics in the case where the sign sgn(θs) is negative (−). The same applies to FIGS. 7B and 7C.

When, as illustrated by, for example, a reference sign 72, the sign sgn(θs) is positive and the angular acceleration α is positive, the characteristics of the inertia coefficient ΔJ are set in such a way that the inertia coefficient ΔJ has a comparatively large value in order to generate a reaction force causing the first steering angle θs to decelerate when the driver further turns the steering wheel (when the first steering angle θs and the angular velocity ω have the same sign).

When, as illustrated by, for example, a reference sign 73, the sign sgn(θs) is positive and the angular acceleration α is negative, the characteristics of the inertia coefficient ΔJ are set in such a way that the inertia coefficient ΔJ has a comparatively small value in order to reduce reaction force because the deceleration of the first steering angle θs is an adequate deceleration in the case of the driver further turning the steering wheel.

In the case of the driver returning the steering wheel (when the first steering angle θs and the angular velocity ω have different signs), the characteristics of the inertia coefficient ΔJ are set in such a way that the inertia coefficient ΔJ has a comparatively small value in order to reduce reaction force because acceleration of the first steering angle θs is an excessive acceleration. Note that the characteristics of the inertia coefficient ΔJ may be differentiated between when the driver further turns the steering wheel and when the driver returns the steering wheel.

The inertia coefficient ΔJ in the case where the sign sgn(θs) is negative (the dashed line) has characteristics that is line-symmetric to the characteristics of the inertia coefficient ΔJ in the case where the sign sgn(θs) is positive (the solid line) with the axis on which the angular acceleration α=0 holds as the symmetry axis.

The inertia coefficient ΔJ may have dead zones Rdp and Rdm with respect to the angular acceleration α. The width of a positive range and the width of a negative range within each of the dead zones Rdp and Rdm may be different from each other.

Figure 7B:
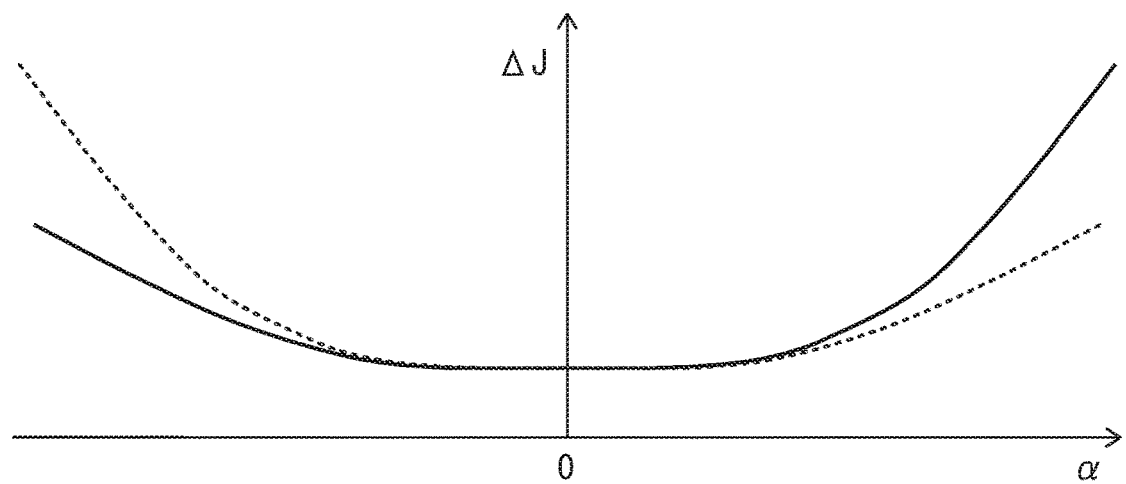
Figure 7C:
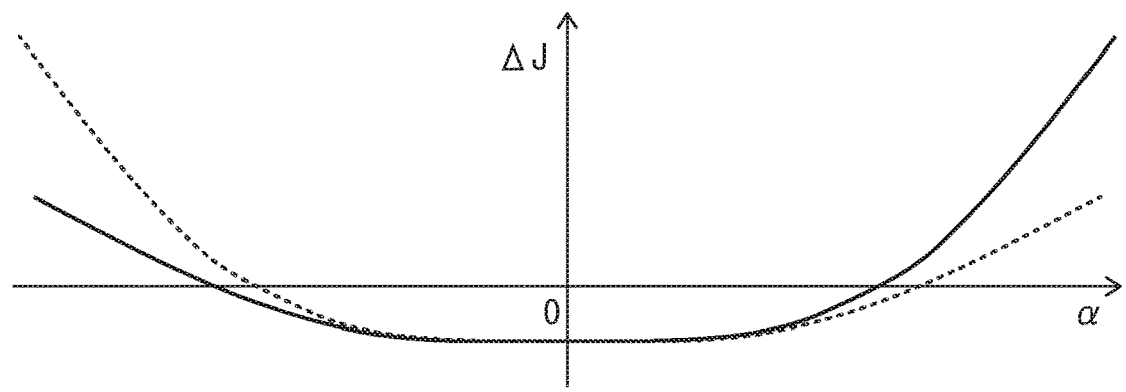

As illustrated in FIGS. 7B and 7C, the characteristics of the inertia coefficient ΔJ may be offset in such a way that the inertia coefficient ΔJ has a positive or negative value, which is not 0, at the point at which the angular acceleration α=0 holds.

In a low inertia system such as a small-size vehicle, increasing the inertia coefficient ΔJ as illustrated in FIG. 7B enables stability to be increased. On the other hand, in a high inertia system such as a large-size vehicle, decreasing the inertia coefficient ΔJ as illustrated in FIG. 7C enables responsiveness to be increased.

FIG. 5 is now referred to. The adder 69 adds the elastic torque component (K0·θr), the viscous torque component (μ·ω), and the inertia torque component (ΔJ·α) and thereby calculates the turning torque Tm of the formula (3) above.

The conversion coefficient table 70 outputs a conversion coefficient (1/Kb) for converting the turning torque Tm to the steering angle correction value Δθ. The constant Kb is the sum of reaction force from the road surface and the lifting torque. Since the reaction force from the road surface changes according to the vehicle speed Vh, the conversion coefficient table 70 may output different conversion coefficients 1/Kb depending on the vehicle speed Vh.

The multiplier 71 multiplies the turning torque Tm by the conversion coefficient (1/Kb) in accordance with the formula (4) above and thereby converts the turning torque Tm to the steering angle correction value Δθ.

Note that the inertia torque component (ΔJ·α) is not necessarily essential and the sign determination unit 65, the differentiator 66, the inertia coefficient table 67, and the multiplier 68 may be omitted.

In addition, both the elastic torque component (K0·θr) and the viscous torque component (μ·ω) do not have to be generated, and either thereof may be omitted. In this case, either a combination of the spring constant table 60 and the multiplier 61 or a combination of the differentiator 62, the viscosity coefficient table 63, and the multiplier 64 may be omitted.

The turning angle sensor 26, the steering angle sensor 14, the turning motor 22, the reaction force motor 21, and the torque sensor 10 are examples of a first steering angle detection unit, a second steering angle detection unit, a first actuator, a second actuator, and a reaction torque detection unit described in the claims, respectively.

The turning angle command value calculation unit 30 is an example of a target steering angle calculation unit and a target reaction force calculation unit described in the claims.

The control angle θr and the control angle calculation unit 31 are examples of steering angular displacement and a steering angular displacement calculation unit described in the claims, respectively.

The end-abutting impact mitigation control unit 32 and the subtracter 33 are examples of a steering angle correction value calculation unit and a corrected target steering angle calculation unit described in the claims, respectively.

The turning angle control unit 34 is an example of a steering angle control unit described in the claims.

The spring constant table 60, the multipliers 61, 64, and 68, the differentiators 62 and 66, the viscosity coefficient table 63, the sign determination unit 65, the inertia coefficient table 67, and the adder 69 are an example of a turning torque calculation unit described in the claims.

The conversion coefficient table 70 and the multiplier 71 are an example of a first conversion unit described in the claims.

The reaction force correction coefficient table 54, the multiplier 55, and the adder 56 are an example of a target reaction force correction unit described in the claims.

(Operation)

Figure 8:
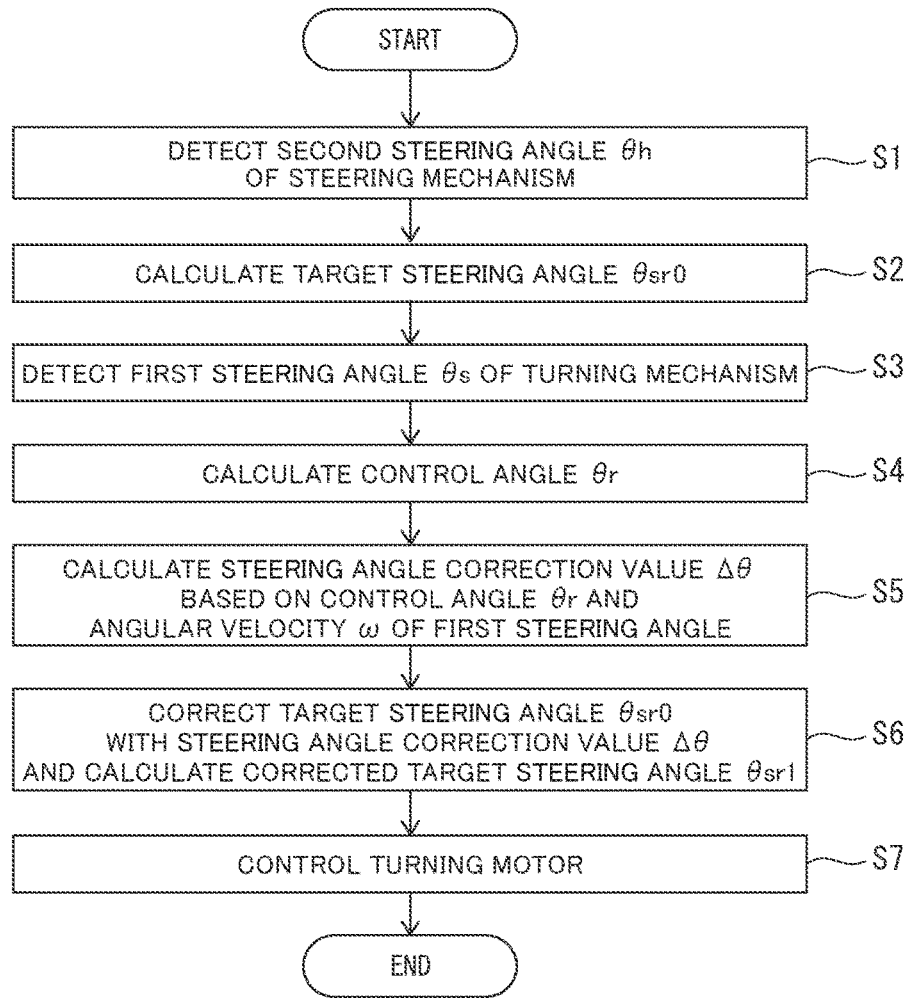
FIG. 8 is a flowchart of an example of a turning control method of the first embodiment.

Next, with reference to FIG. 8, a turning control method of the first embodiment will be described.

In step S1, the steering angle sensor 14 detects a second steering angle θh of the steering mechanism.

In step S2, the turning angle command value calculation unit 30 calculates a target steering angle θsr0, based on at least the second steering angle θh.

In step S3, the turning angle sensor 26 detects a first steering angle θs of the turning mechanism.

In step S4, the control angle calculation unit 31 calculates a steering angular displacement of the first steering angle θs with a first threshold steering angle used as a reference as a control angle θr when the first steering angle θs is in a range from a positive first threshold steering angle to a positive maximum steering angle or the first steering angle θs is in a range from a negative first threshold steering angle to a negative maximum steering angle.

In step S5, the end-abutting impact mitigation control unit 32 calculates a steering angle correction value Δθ, based on the control angle θr and angular velocity ω of the first steering angle θs.

In step S6, the subtracter 33 corrects the target steering angle θsr0 with the steering angle correction value Δθ and thereby calculates a corrected target steering angle Δsr1.

In step S7, the turning angle control unit 34 controls the turning motor 22 in such a way that the first steering angle θs coincides with the corrected target steering angle θsr1. Subsequently, the process terminates.

Advantageous Effects of First Embodiment (1) The turning control device includes the turning angle sensor 26 that detects the first steering angle θs of the turning mechanism, the turning motor 22 that drives the turning mechanism, the steering angle sensor 14 that detects the second steering angle θh of the steering mechanism, the turning angle command value calculation unit 30 that calculates the target steering angle θsr0 of the turning mechanism, based on at least the second steering angle θh, the control angle calculation unit 31 that, when the first steering angle θs is in a range from a maximum steering angle that the first steering angle θs can take to the first threshold steering angle, calculates the control angle θr that is a steering angular displacement of the first steering angle θs with the first threshold steering angle used as a reference, the end-abutting impact mitigation control unit 32 that calculates the steering angle correction value Δθ according to at least the control angle θr, the subtracter 33 that corrects the target steering angle θsr0 with the steering angle correction value Δθ and thereby calculates the corrected target steering angle θsr1, and the turning angle control unit 34 that controls the turning motor 22 in such a way that the first steering angle θs coincides with the corrected target steering angle θsr1.

Because of this configuration, in the turning device that control the first steering angle θs of the turning mechanism, based on the target steering angle θsr0, it is possible to suppress increase in the first steering angle θs when the rack 5b comes close to a stroke end and thereby suppress impact and hit sound (abnormal noise) due to end-abutting.

(2) The end-abutting impact mitigation control unit 32 includes the spring constant table 60 and the multiplier 61 that calculate a torque including the elastic torque (K0·θr) based on the control angle θr as the turning torque Tm to be exerted on the turning mechanism and the conversion coefficient table 70 and the multiplier 71 that convert the turning torque Tm to the steering angle correction value Δθ.

This configuration enables change in the first steering angle θs when reaction torque including the elastic torque (K0·θr) acts on the turning mechanism to be reflected on the target steering angle θsr0. As a result, it is possible to suppress increase in the first steering angle θs and thereby suppress impact and hit sound (abnormal noise) due to end-abutting.

(3) The end-abutting impact mitigation control unit 32 includes the spring constant table 60 and the multiplier 61 and the differentiator 62, the viscosity coefficient table 63, and the multiplier 64 that calculate, as the turning torque Tm, a torque including at least either the elastic torque (K0·θr) based on the control angle θr or the viscous torque (μ·ω) based on the angular velocity ω of the first steering angle θs and the control angle θr and the conversion coefficient table 70 and the multiplier 71 that convert the turning torque Tm to the steering angle correction value Δθ.

This configuration enables change in the first steering angle θs when reaction torque including at least either the elastic torque (K0·θr) or the viscous torque (μ·ω) acts on the turning mechanism to be reflected on the target steering angle θsr0. As a result, it is possible to suppress increase in the first steering angle θs and thereby suppress impact and hit sound (abnormal noise) due to end-abutting.

(4) The differentiators 62 and 66, the inertia coefficient table 67, and the multiplier 68 calculate an inertia torque ($\Delta J \cdot \alpha$) based on the angular acceleration $\alpha$ of the first steering angle $\theta s$. The adder 69 adds the inertia torque ($\Delta J \cdot \alpha$) to at least either the elastic torque ($K0 \cdot \theta r$) or the viscous torque ($\mu \cdot \omega$) and thereby calculates a turning torque Tm.

This configuration enables inertia torque in acceleration and deceleration of the first steering angle $\theta s$ to be adjusted.

(5) The conversion coefficient table 70 outputs a conversion coefficient (1/Kb) depending on the vehicle speed Vh. The multiplier 71 converts the turning torque Tm, using the conversion coefficient (1/Kb) and thereby calculates a steering angle correction value $\Delta \theta$.

This configuration enables road surface reaction force changing according to the vehicle speed Vh to be reflected on the steering angle correction value $\Delta \theta$.

(6) The turning angle command value calculation unit 30 calculates a target reaction force Thr that is applied to the steering mechanism, based on at least the second steering angle $\theta h$ and corrects the target reaction force Thr according to the steering angle correction value $\Delta \theta$. The reaction motor 21 applies reaction torque to the steering mechanism according to the target reaction force Thr corrected according to the steering angle correction value $\Delta \theta$.

This configuration enables the reaction torque to be increased when the end-abutting impact mitigation control is performed and the second steering angle $\theta h$ to be suppressed from increasing. In addition, notifying the driver of the rack 5b coming close to a stroke end enables the second steering angle $\theta h$ to be suppressed from increasing. As a result, it is possible to suppress the target steering angle $\theta sr0$ from increasing in directions toward the maximum steering angles and effectively generate virtual stroke ends of the rack 5b.

(First Variation)

The control angle calculation unit 31 may calculate a control angle $\theta r$, based on the second steering angle $\theta h$ of the steering mechanism. The same applies to a second embodiment and a third embodiment, which will be described below. In this case, the control angle calculation unit 31 sets a second steering angle $\theta h$ of the steering mechanism corresponding to a maximum steering angle of the first steering angle $\theta s$ as a maximum steering angle that the second steering angle $\theta h$ can take. When the second steering angle $\theta h$ is in an angular range from the maximum steering angle to a first threshold steering angle, the control angle calculation unit 31 may calculate a steering angular displacement of the second steering angle $\theta h$ with the first threshold steering angle used as a reference as a control angle $\theta r$.

(Second Variation)

The control angle calculation unit 31 may alter the first threshold steering angle $\theta tR1$ or $\theta tL1$ when the first steering angle $\theta s$ exceeds a predetermined second threshold steering angle. This configuration enables the first threshold steering angle $\theta tR1$ or $\theta tL1$, at which the end-abutting impact mitigation control is started, to be optimized. In the steering angle value to a physical rack end, production variations or variations occurring when a turning mechanism is mounted on a vehicle are included. A "rack end" means a state in which the rack 5b has reached a stroke end. A first threshold steering angle $\theta tR1$ or $\theta tL1$ that is set at a position excessively apart from a physical rack end in a direction toward the neutral position causes an excessive reaction force to be generated, which inhibits operation by the driver. There is a possibility that this inhibition causes the minimum turning radius to become large. Altering the first threshold steering angle $\theta tR1$ or $\theta tL1$ when the first steering angle $\theta s$ exceeds a predetermined second threshold steering angle enables an excessive reaction force to be prevented from being generated and influence on the minimum turning radius to be reduced. The same applies to the second embodiment and the third embodiment, which will be described below.

Figure 9:
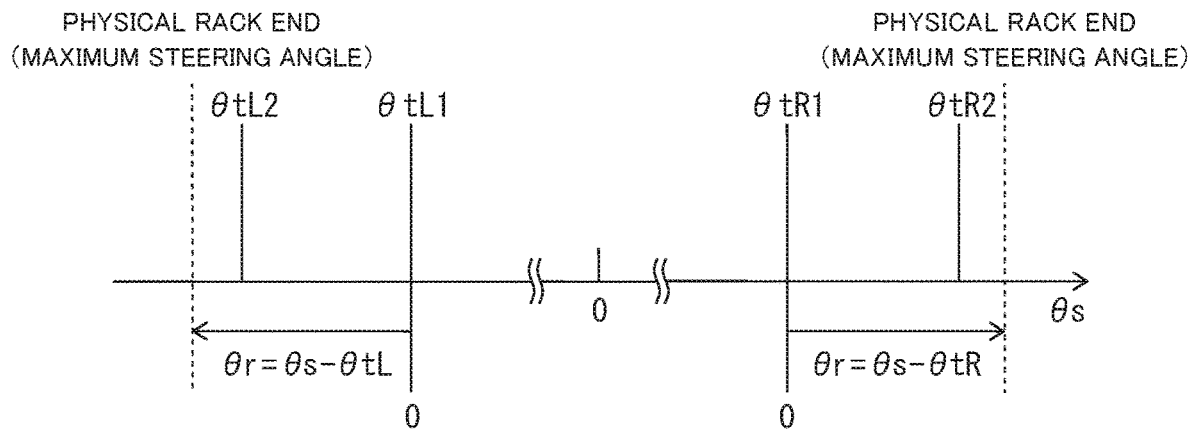
FIG. 9 is an explanatory diagram of an operation example of a control angle calculation unit in a variation.

FIG. 9 is now referred to. A positive second threshold steering angle $\theta tR2$ is set at a value larger than the positive first threshold steering angle $\theta tR1$, and a negative second threshold steering angle $\theta tL2$ is set at a value smaller than the negative first threshold steering angle $\theta tL1$. In other words, the absolute values $|\theta tR2|$ and $|\theta tL2|$ of the second threshold steering angles are larger than the absolute values $|\theta tR1|$ and $|\theta tL1|$ of the first threshold steering angles, respectively.

The control angle calculation unit 31 alters the positive first threshold steering angle $\theta tR1$ according to, for example, a difference ($\theta s - \theta tR2$) between the first steering angle $\theta s$ and the second threshold steering angle $\theta tR2$ when the first steering angle $\theta s$ becomes larger than the positive second threshold steering angle $\theta tR2$ (that is, when the absolute value $|\theta s|$ becomes larger than the absolute value $|\theta tR2|$). For example, the control angle calculation unit 31 may set the sum of the difference ($\theta s - \theta tR2$) and the first threshold steering angle $\theta tR1$ as a new first threshold steering angle $\theta tR1$. For example, the control angle calculation unit 31 may alter the first threshold steering angle $\theta tR1$ when the difference ($\theta s - \theta tR2$) exceeds a predetermined value.

The control angle calculation unit 31 alters the negative first threshold steering angle $\theta tL1$ according to, for example, a difference ($\theta s - \theta tL2$) between the first steering angle $\theta s$ and the second threshold steering angle $\theta tL2$ when the first steering angle $\theta s$ becomes smaller than the negative second threshold steering angle $\theta tL2$ (that is, when the absolute value $|\theta s|$ becomes larger than the absolute value $|\theta tL2|$). For example, the control angle calculation unit 31 may set the sum of the difference ($\theta s - \theta tL2$) and the first threshold steering angle $\theta tL1$ as a new first threshold steering angle $\theta tL1$. For example, the control angle calculation unit 31 may alter the first threshold steering angle $\theta tL1$ when the difference ($\theta tR2 - \theta s$) exceeds a predetermined value.

(Third Variation)

The end-abutting impact mitigation control unit 32 described with reference to FIG. 5 exerts the viscous torque component ($\mu \cdot \omega$), which is the product of the angular velocity $\omega$ of the first steering angle $\theta s$ and the viscosity coefficient $\mu$, in a direction in which the turning mechanism is returned to the neutral position.

Between such a viscous torque component and the angular velocity $\omega$, there is an interaction in which, as the viscous torque component increases, the angular velocity $\omega$ decreases, as the angular velocity $\omega$ decreases, the viscous torque component becomes smaller, as the viscous torque component becomes smaller, the angular velocity $\omega$ increases, and the viscous torque component increases again. There is a possibility that this interaction causes the angular velocity $\omega$ to repeat increase and decrease and repetition of increase and decrease in the viscous torque component associated therewith causes vibration to occur.

Thus, the end-abutting impact mitigation control unit 32 of a third variation sets, in place of the viscous torque component ($\mu \cdot \omega$) proportional to the angular velocity $\omega$, a viscous torque component Tv that nonlinearly increases with respect to increase in the angular velocity $\omega$. The same applies to the second embodiment and the third embodiment, which will be described below.

Since such a viscous torque component Tv nonlinearly changes with respect to the angular velocity $\omega$, it is possible to reduce a rate of change ($dTv/d\omega$) of the viscous torque component Tv with respect to the angular velocity ω in an arbitrary velocity range of the angular velocity ω.

Since reducing the rate of change of the viscous torque component Tv with respect to the angular velocity ω causes the viscous torque component Tv to be less likely to increase and decrease even when the angular velocity ω increases and decreases, the interaction between the viscous torque component Tv and the angular velocity ω becomes small. As a result, the above-described vibration occurring due to repetition of increase and decrease in the angular velocity ω and the viscous torque component Tv is reduced.

Reducing the rate of change of the viscous torque component Tv with respect to the angular velocity ω in a velocity range of the angular velocity ω in which the amplitude of the above-described vibration becomes a problem enables the above-described vibration in the velocity range to be reduced.

hereinafter, the above-described vibration occurring to the steering system due to repetition of increase and decrease in the viscous torque component is simply referred to as "vibration to be suppressed".

Figure 10:
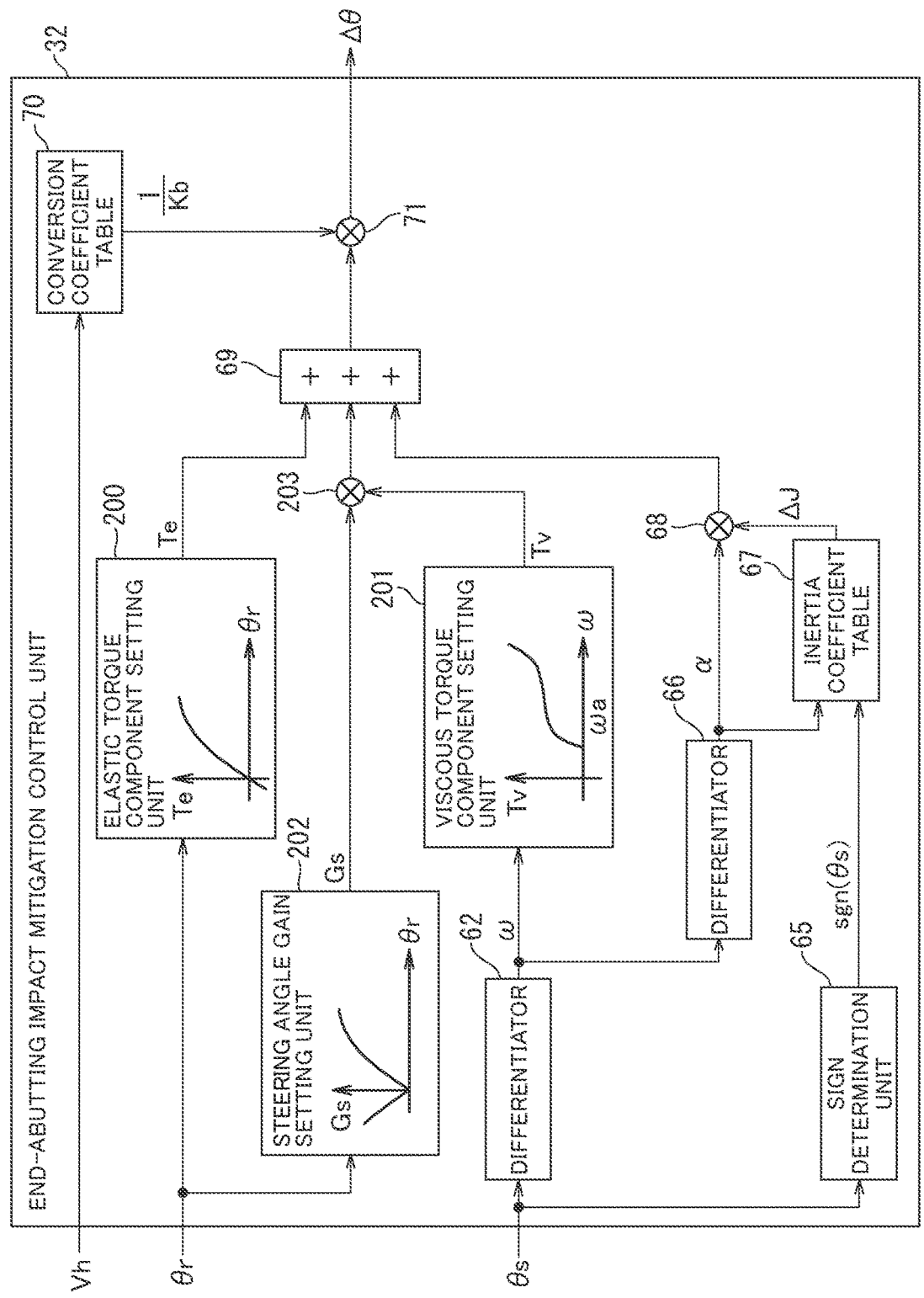
FIG. 10 is a block diagram illustrative of an example of a functional configuration of a variation of the end-abutting impact mitigation control unit.

FIG. 10 is a block diagram illustrative of an example of a functional configuration of an end-abutting impact mitigation control unit 32 of the third variation. The end-abutting impact mitigation control unit 32 of the third variation includes an elastic torque component setting unit 200, a viscous torque component setting unit 201, a steering angle gain setting unit 202, and a multiplier 203.

The elastic torque component setting unit 200 sets an elastic torque component Te of turning torque Tm, based on the control angle θr and outputs the elastic torque component Te to an adder 69.

As illustrated in FIG. 10, the value of the elastic torque component Te is set at "0" when the control angle θr is "0". In a range in which the control angle θr is greater than "0", the elastic torque component Te monotonically increases with respect to increase in the control angle θr.

In a range in which the control angle θr has a negative value, the elastic torque component Te has characteristics that is origin symmetric to the characteristics in a range in which the control angle θr has a positive value. In other words, in a range in which the control angle θr is less than "0", the elastic torque component Te monotonically decreases with respect to decrease in the control angle θr. In other words, the absolute value of the elastic torque component Te monotonically increases.

A relationship between the control angle θr and the elastic torque component Te can be set in the elastic torque component setting unit 200 as, for example, map data or a calculation formula in advance.

It may be set such that the elastic torque component Te is "0" in a vicinity of the point at which the control angle θr is "0".

The viscous torque component setting unit 201 sets the viscous torque component Tv, which nonlinearly increases with respect to increase in the angular velocity ω, based on the angular velocity ω.

Figure 11:
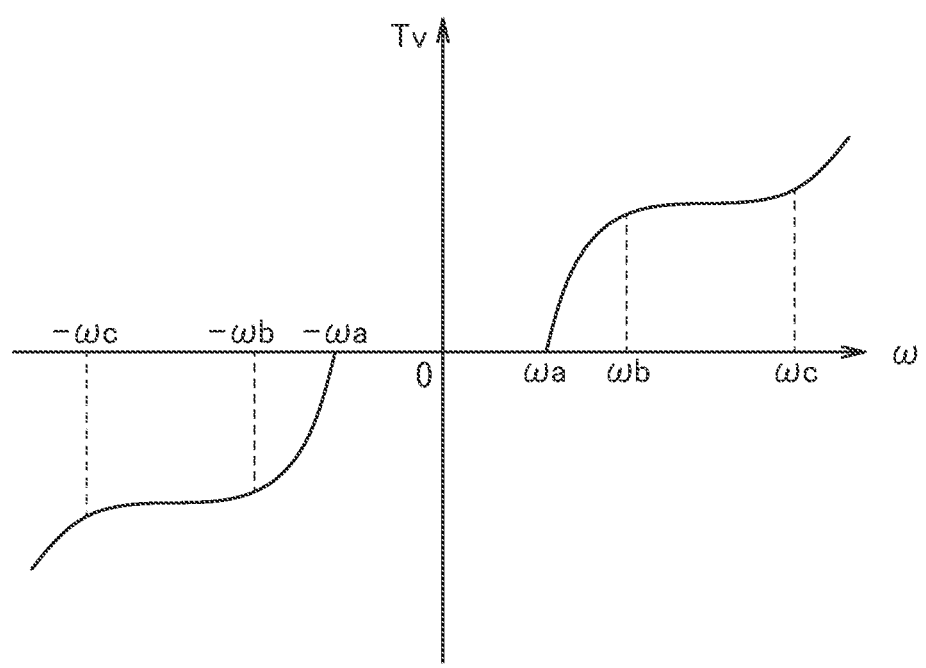
FIG. 11 is an explanatory diagram of an example of characteristics of a viscous torque component in the variation.

FIG. 11 is an explanatory diagram of an example of characteristics of the viscous torque component Tv with respect to the angular velocity ω.

In a velocity range from (−ωa) to ωa, no problem is caused by impact at the time of end-abutting because the angular velocity ω is low (for example, abnormal noise is low or there is no damage to the turning mechanism). In such a velocity range from (−ωa) to ωa, the value of the viscous torque component Tv is set at "0". Because of this setting, it is possible to suppress influence of the viscous torque component Tv on steering feeling by not generating the viscous torque component Tv in a velocity range in which no problem is caused by impact at the time of end-abutting and.

In a velocity range higher than the angular velocity ωa (a range in which the value of the angular velocity ω is larger than ωa), the viscous torque component Tv monotonically increases in a nonlinear manner with respect to increase in the angular velocity ω.

In a velocity range higher than the angular velocity (−ωa) (a range in which the value of the angular velocity ω is smaller than a negative value (−ωa), that is, a range in which the absolute value |ω| is greater than the absolute value |−ωa|), the viscous torque component Tv monotonically decreases in a nonlinear manner with respect to decrease in the angular velocity ω. In other words, in a velocity range higher than the angular velocity (−ωa), the absolute value of the viscous torque component Tv also increases with respect to decrease in the angular velocity ω.

In a velocity range from ωa to ωb, the higher the angular velocity ω is, the larger positive viscous torque component Tv is set. In a negative velocity range from (−ωa) to (−ωb), the higher the angular velocity ω is, the smaller negative viscous torque component Tv is set. In other words, since, as the angular velocity ω becomes higher, a viscous torque component Tv the absolute value of which is larger is generated, it is possible to suppress end-abutting from occurring at high angular velocity ω.

In velocity ranges from ωb to ωc and from (−ωb) to (−ωc), which are higher than the angular velocities ωb and (−ωb), respectively, the vibration to be suppressed becomes large and the amplitude thereof becomes a problem.

Thus, in the velocity ranges from ωb to ωc and from (−ωb) to (−ωc), the rate of change (dTv/dω) of the viscous torque component Tv with respect to the angular velocity ω is reduced compared with the other velocity ranges (that is, the velocity range from ωa to ωb and the velocity range from (−ωa) to (−ωb) and a range higher than an angular velocity ωc and a range higher than an angular velocity (−ωc)).

Since this setting causes the viscous torque component Tv to be less likely to increase and decrease even when the angular velocity ω increases and decreases, the interaction between the viscous torque component Tv and the angular velocity ω becomes small. As a result, it is possible to reduce vibration to be suppressed in the velocity range from ωb to ωc and the velocity range from (−ωb) to (−ωc).

In velocity ranges higher than the angular velocity ωc and (−ωc), since the rack 5b reaches the physical rack ends fast, a period of time during which vibration to be suppressed occurs is negligible. When the angular velocity ω is high, it is preferable to make the viscous torque component Tv larger and thereby suppress impact at the time of end-abutting.

Therefore, in a velocity range higher than the angular velocity ωc, the higher the angular velocity ω is, the larger positive viscous torque component Tv is set.

In addition, in a velocity range higher than the velocity (−ωc), the higher the angular velocity ω is, the smaller negative viscous torque component Tv is set. In other words, since, as the angular velocity ω becomes higher, a viscous torque component Tv the absolute value of which is larger is generated, it is possible to prevent end-abutting from occurring at high angular velocity ω.

A relationship between the angular velocity ω and the viscous torque component Tv can be set in the viscous torque component setting unit 201 as, for example, map data or a calculation formula in advance.

The steering angle gain setting unit 202 sets a steering angle gain Gs depending on the control angle θr. As illustrated in FIG. 10, the value of the steering angle gain Gs is set at "0" when the control angle θr is "0". In a range in which the control angle θr is positive, the steering angle gain Gs monotonically increases with respect to increase in the control angle θr, and, in a range in which the control angle θr is negative, the steering angle gain Gs monotonically increases with respect to decrease in the control angle θr.

A relationship between the control angle θr and the steering angle gain Gs can be set in the steering angle gain setting unit 202 as, for example, map data or a calculation formula in advance.

The multiplier 203 calculates a product (Gs·Tv) of the steering angle gain Gs and the viscous torque component Tv and outputs the product to the adder 69.

The adder 69 adds the elastic torque component Te, the product (Gs·Tv), and the inertia torque component (ΔJ·α) and thereby calculates the turning torque Tm in the formula (3) above.

The product (Gs·Tv) is an example of "viscous torque based on angular velocity of the first steering angle and the steering angular displacement" described in the claims.

(Fourth Variation)

The elastic torque component setting unit 200 and the steering angle gain setting unit 202 may set the elastic torque component Te and the steering angle gain Gs, based on, in place of the control angle θr, the first steering angle θs. In this case, the control angle calculation unit 31 may be omitted. The same applies to the second embodiment and the third embodiment, which will be described below.

Thus, an elastic torque component setting unit 200 of a fourth variation stores, in place of a relationship between the control angle θr and the elastic torque component Te, a relationship between the first steering angle θs and the elastic torque component Te as, for example, map data or a calculation formula.

Figure 12:
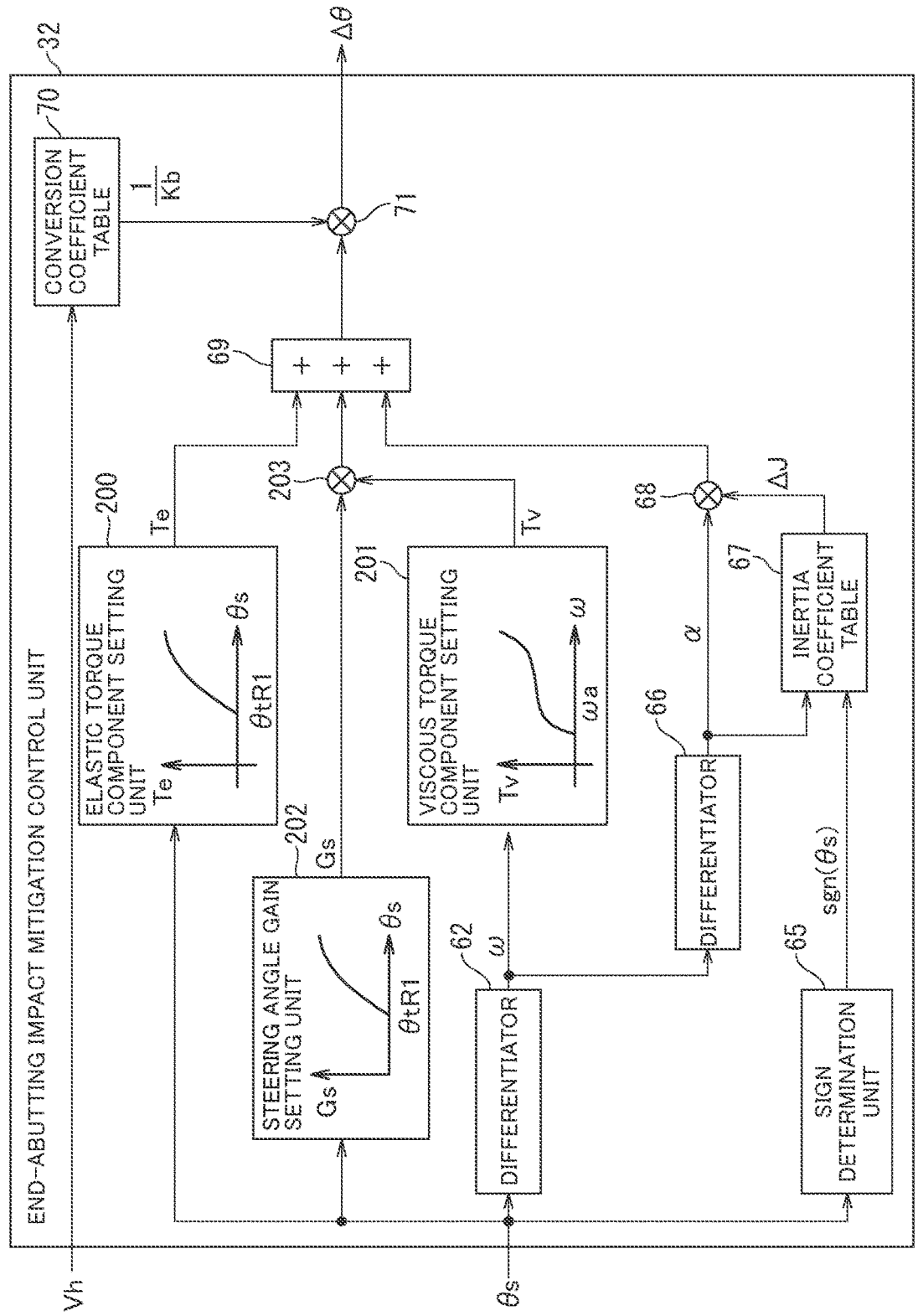
FIG. 12 is a block diagram illustrative of an example of a functional configuration of another variation of the end-abutting impact mitigation control unit.

As illustrated in FIG. 12, when the first steering angle θs is equal to or less than the first threshold steering angle θtR1, the value of the elastic torque component Te is set at "0".

When the first steering angle θs is in a range from the first threshold steering angle θtR1 to a positive maximum steering angle, the positive elastic torque component Te monotonically increases with respect to increase in the first steering angle θs.

When the first steering angle θs is equal to or greater than the first threshold steering angle θtL1, the value of the elastic torque component Te is set at "0". When the first steering angle θs is in a range from the first threshold steering angle θtL1 to a negative maximum steering angle, the negative elastic torque component Te monotonically decreases (that is, the absolute value of the elastic torque component Te increases) as the negative first steering angle θs decreases.

When the first steering angle θs is in a range from the first threshold steering angle θtL1 to the first threshold steering angle θtR1, the value of the elastic torque component Te is set at "0".

It may be configured such that a third threshold steering angle and a fourth threshold steering angle are set between the first threshold steering angle θtR1 and the positive maximum steering angle and between the first threshold steering angle θtL1 and the negative maximum steering angle, respectively, and the value of the elastic torque component Te is set at "0" when the first steering angle θs is in a range from the third threshold steering angle to the fourth threshold steering angle. It may also be configured such that the elastic torque component Te monotonically increases or monotonically decreases with respect to the magnitude of the first steering angle θs when the first steering angle θs is in a range other than the above-described range.

A steering angle gain setting unit 202 of the fourth variation stores, in place of a relationship between the control angle θr and the steering angle gain Gs, a relationship between the first steering angle θs and the steering angle gain Gs as, for example, map data or a calculation formula.

As illustrated in FIG. 12, when the first steering angle θs is equal to or less than the first threshold steering angle θtR1, the value of the steering angle gain Gs is set at "0".

When the first steering angle θs is in a range from the first threshold steering angle θtR1 to the positive maximum steering angle, the positive steering angle gain Gs monotonically increases with respect to increase in the first steering angle θs.

When the first steering angle θs is equal to or greater than the first threshold steering angle θtL1, the value of the steering angle gain Gs is set at "0". When the first steering angle θs is in a range from the first threshold steering angle θtL1 to the negative maximum steering angle, the positive steering angle gain Gs monotonically increases as the negative first steering angle θs decreases.

When the first steering angle θs is in a range from the first threshold steering angle θtL1 to the first threshold steering angle θtR1, the value of the steering angle gain Gs is set at "0".

Second Embodiment

A turning control device of a second embodiment sets a target angular velocity ωr0 of angular velocity ω of a first steering angle θs and performs angular velocity control in such a way that the angular velocity ω comes close to the target angular velocity ωr0 and, in conjunction therewith, performs end-abutting impact mitigation control that is similar to the above-described end-abutting impact mitigation control.

Turning torque Tm, which is exerted in a direction in which a turning mechanism is returned to a neutral position in the end-abutting impact mitigation control, includes an elastic torque component (K0·θr) and a viscous torque component (μ·ω), as expressed by the formula (3) above.

The elastic torque (K0·θr) is a component obtained by multiplying a control angle θr by a constant K0 and can be interpreted to be physical quantity having the same units as an angle.

On the other hand, the viscous torque (μ·ω) is a component obtained by multiplying angular velocity ω by a coefficient μ and can be interpreted to be physical quantity having the same units as angular velocity.

As such, a target steering angle θsr0 of the first steering angle θs is corrected by a steering angle correction value Δθ based on the elastic torque (K0·θr), and the target angular velocity ωr0 is corrected by an angular velocity correction value Δω based on the viscous torque (μ·ω).

Making the units of correction targets (that is, the target steering angle and the target angular velocity) the same as the units of correction amounts (that is, the elastic torque and the viscous torque) causes handling of the elastic torque and the viscous torque used for correction to be facilitated.

The second embodiment will be described in detail below. The turning device of the second embodiment has a configuration similar to that of the turning device of the first embodiment, and the same reference signs are assigned to the same constituent elements and overlapping description will be omitted.

Figure 13:
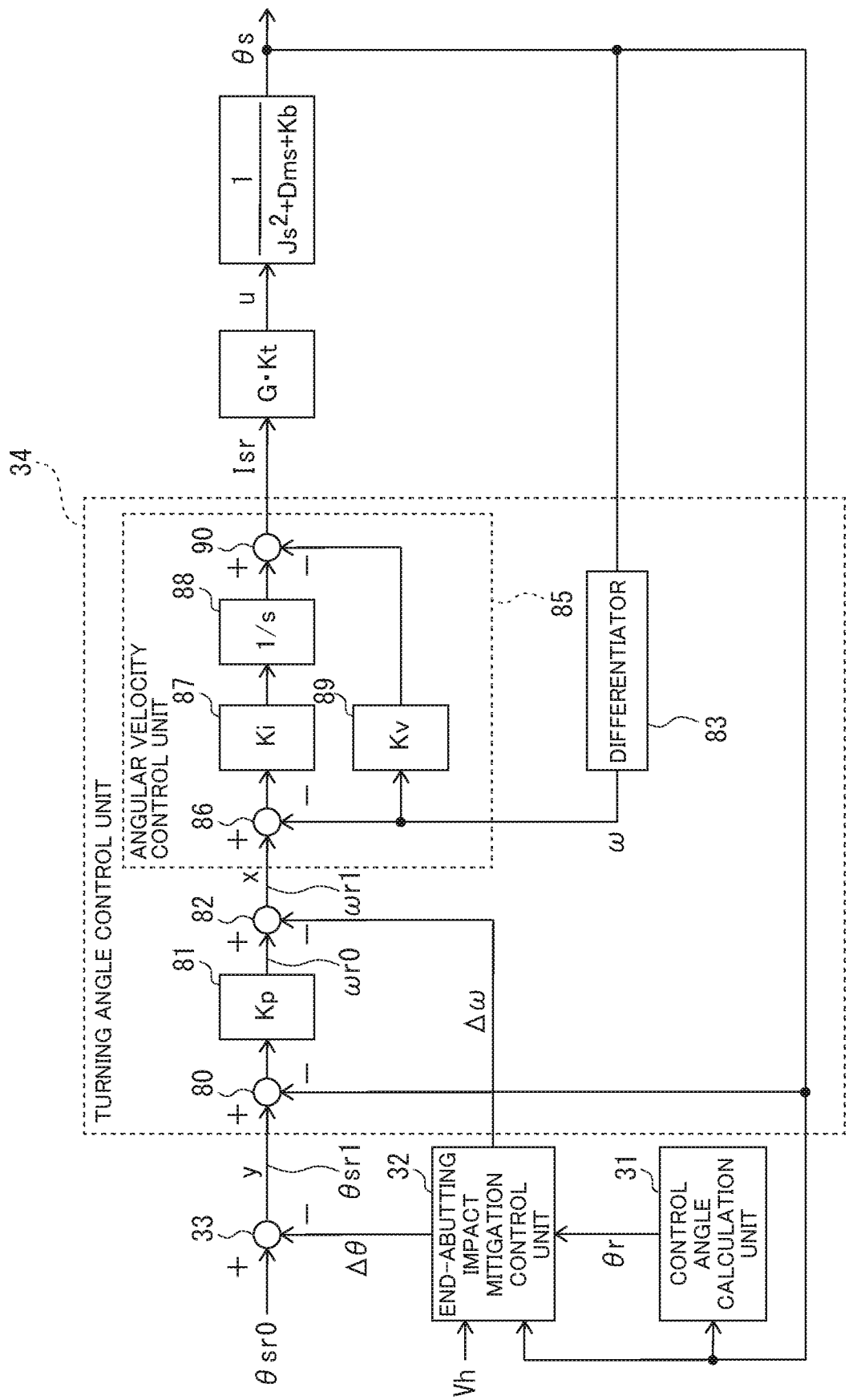
FIG. 13 is a block diagram illustrative of an example of a control system of a second embodiment.

FIG. 13 is a block diagram illustrative of an example of a control system of the second embodiment. In FIG. 13, a reference sign G denotes a gear ratio of a reduction gear 23, and a reference sign Kt denotes a torque constant of a turning motor 22.

An end-abutting impact mitigation control unit 32 of the second embodiment calculates a steering angle correction value Δθ for correcting the target steering angle θsr0 and an angular velocity correction value Δω for correcting the target angular velocity ωr0 in end-abutting impact mitigation. Details of the end-abutting impact mitigation control unit 32 of the second embodiment will be described later.

A turning angle control unit 34 includes subtracters 80 and 82, a target angular velocity calculation unit 81, a differentiator 83, and an angular velocity control unit 85.

The target angular velocity calculation unit 81 multiplies deviation between a corrected target steering angle θsr1 and an actual first steering angle θs, which is output from the subtracter 80, by a constant Kp and thereby calculates a target angular velocity ωr0.

The subtracter 82, by subtracting the angular velocity correction value Δω from the target angular velocity ωr0, which the target angular velocity calculation unit 81 calculated, corrects the target angular velocity ωr0 and obtains a corrected target angular velocity ωr1.

The differentiator 83 differentiates the first steering angle θs and thereby calculates an angular velocity ω. The differentiator 83 may be made to also serve as the differentiator 62 of the end-abutting impact mitigation control unit 32.

The angular velocity control unit 85 generates a current command value Isr for controlling the turning motor 22 in such a way that the angular velocity ω comes close to the corrected target angular velocity ωr1. The angular velocity control unit 85 includes subtracters 86 and 90, gain multiplication units 87 and 89, and an integrator 88.

The gain multiplication unit 87 multiplies deviation (ωr1−ω) between the angular velocity ω and the corrected target angular velocity ωr1, which is output from the subtracter 86, by a constant Ki. The integrator 88 integrates output from the gain multiplication unit 87.

The gain multiplication unit 89 multiplies the angular velocity ω by a constant Kv. The subtracter 90 calculates a difference obtained by subtracting output from the gain multiplication unit 89 from output from the integrator 88 as a current command value Isr.

Figure 14:
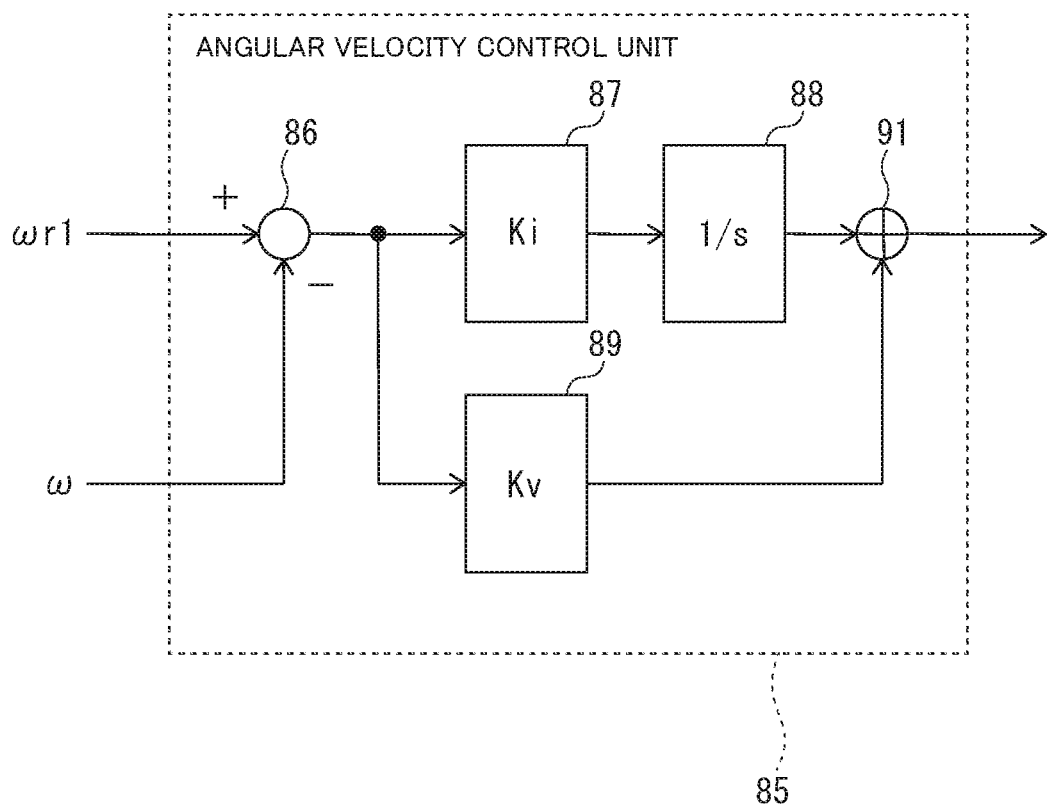
FIG. 14 is a block diagram of another functional configuration example of an angular velocity control unit illustrated in FIG. 13.

Another configuration example of the angular velocity control unit 85 is illustrated in FIG. 14. In this configuration example, the gain multiplication unit 89 multiplies the deviation (ωr1−ω) between the angular velocity ω and the corrected target angular velocity ωr1 by the constant Kv. An adder 91 calculates a sum of output from the integrator 88 and output from the gain multiplication unit 89 as a current command value Isr.

Next, a calculation method of a conversion coefficient for converting the viscous torque (μ·ω) to the angular velocity correction value Δω will be described.

FIG. 13 is now referred to. It is now assumed that characteristics of the turning mechanism, tires, and road surface reaction force are expressed by $1/(Js^2+Dms+Kb)$. When the characteristics of the road surface reaction force are excluded, characteristics from input u into the turning mechanism to the angular velocity ω of the first steering angle θs is expressed by the formula (5) below.

[Math 4]

$$\omega = \frac{1}{J \cdot s + Dm} u \quad (5)$$

When the input u is assumed to be a step input, a final value ω1 of the angular velocity ω is obtained as expressed by the formula (6) below.

[Math 5]

$$\omega 1 = \lim_{s \to 0} s \frac{1}{J \cdot s + Dm} u \frac{1}{s} = \frac{1}{Dm} u \quad (6)$$

On the other hand, characteristics from input x into the angular velocity control unit 85 to the angular velocity ω in FIG. 13 is expressed by the formula (7) below.

[Math 6]

$$\omega = \frac{Ki \cdot G \cdot Kt}{J \cdot s^2 + (Dm + Kv \cdot G \cdot Kt)s + (Kb + Ki \cdot G \cdot Kt)} x \quad (7)$$

When the input x is assumed to be a step input, a final value ω2 of the angular velocity ω is obtained as expressed by the formula (8) below.

[Math 7]

$$\omega 2 = \lim_{s \to 0} s \frac{Ki \cdot G \cdot Kt}{J \cdot s^2 + (Dm + Kv \cdot G \cdot Kt)s + (Kb + Ki \cdot G \cdot Kt)} x \frac{1}{s} \quad (8)$$
$$= \frac{Ki \cdot G \cdot Kt}{Kb + Ki \cdot G \cdot Kt} x$$

In the case of the angular velocity control unit 85 in FIG. 14, characteristics from input x to the angular velocity ω is expressed by the formula (9) below.

[Math 8]

$$\omega = \frac{(Ki + Kv \cdot s) \cdot G \cdot Kt}{J \cdot s^2 + (Dm + Kv \cdot G \cdot Kt)s + (Kb + Ki \cdot G \cdot Kt)} x \quad (9)$$

When the input x is assumed to be a step input, a final value ω2 of the angular velocity ω is obtained as expressed by the formula (10) below, which is the same result as the formula (8) above.

[Math 9]

$$\omega 2 = \lim_{s \to 0} s \frac{(Ki + Kv \cdot s) \cdot G \cdot Kt}{J \cdot s^2 + (Dm + Kv \cdot G \cdot Kt)s + (Kb + Ki \cdot G \cdot Kt)} x \frac{1}{s} \quad (10)$$
$$= \frac{Ki \cdot G \cdot Kt}{Kb + Ki \cdot G \cdot Kt} x$$

When it is now assumed that ω1=ω2, a relationship between the input x into the angular velocity control unit 85 and the input u into the turning mechanism is expressed by the formula (11) below.

[Math 10]

$$x = \frac{1}{Dm} \frac{Kb + Ki \cdot G \cdot Kt}{Ki \cdot G \cdot Kt} u \quad (11)$$

Therefore, in order to input the viscous torque component ($\mu \cdot \omega$) to the turning mechanism in the end-abutting impact mitigation control, it is only required to calculate a product obtained by multiplying the viscous torque component ($\mu \cdot \omega$) by a conversion coefficient $(Kb+Ki \cdot G \cdot Kt)/(Dm \cdot Ki \cdot G \cdot Kt)$ as an angular velocity correction value $\Delta\omega$ and correct the target angular velocity $\omega r0$ with the angular velocity correction value $\Delta\omega$.

Note that, when $Ki \cdot G \cdot Kt$ is sufficiently large compared with a spring constant Kb, (1/Dm), which is obtained by neglecting the spring constant Kb, may be used as the conversion coefficient. Alternatively, an average value or an intermediate value between $(Kb+Ki \cdot G \cdot Kt)/(Dm \cdot Ki \cdot G \cdot Kt)$ and (1/Dm) may be used as the conversion coefficient.

Since the spring constant Kb changes according to vehicle speed Vh, the conversion coefficient may be altered according to the vehicle speed Vh.

Further, the conversion coefficient may be switched between a conversion coefficient for the case of the driver returning the steering wheel and a conversion coefficient for the case of the driver further turning the steering wheel. For example, it may be configured such that, while the driver is returning the steering wheel, the conversion coefficient $(Kb+Ki \cdot G \cdot Kt)/(Dm \cdot Ki \cdot G \cdot Kt)$ with the spring constant Kb taken into consideration is used and, while the driver further turning the steering wheel, the conversion coefficient (1/Dm) is used.

Since, when the driver returns the steering wheel, a direction in which steering force is applied and a steering direction are different, the steering becomes difficult due to returning force caused by actual spring force $Kb \cdot \theta$. Thus, when the driver returns the steering wheel, the target steering angle may be corrected in a direction opposite to the steering direction.

On the other hand, characteristics from input y into the turning angle control unit 34 to the first steering angle $\theta s$ in FIG. 13 is expressed by the formula (12) below.

[Math 11]

$$\theta s = \frac{Kp \cdot Ki \cdot G \cdot Kt}{J \cdot s^3 + (Dm + Kv \cdot G \cdot Kt) \cdot s^2 + (Kb + Ki \cdot G \cdot Kt) \cdot s + Kp \cdot Ki \cdot G \cdot Kt} y \quad (12)$$

In the case of the turning angle control unit 34 in FIG. 14, characteristics from input y to the first steering angle $\theta s$ is expressed by the formula (13) below. In the formula (13), $G \cdot Kt$ is replace with GK.

[Math 12]

$$\theta s = \frac{Kp \cdot (Ki + Kv \cdot s) \cdot GK}{J \cdot s^3 + (Dm + Kv \cdot GK) \cdot s^2 + (Kb + Kp \cdot Kv \cdot GK + Ki \cdot GK) \cdot s + Kp \cdot Ki \cdot GK} y \quad (13)$$

When it is assumed that the input y is a step input, a final value $\theta 1$ of the first steering angle $\theta s$ becomes $\theta 1 = y$.

On the other hand, a final value $\theta 2$ of the first steering angle $\theta s$ when the input u is input to the physical model of the turning mechanism, the tires, and the road surface reaction force is obtained as expressed by the formula (14) below.

[Math 13]

$$\theta 2 = \lim_{s \to 0} s \frac{1}{J \cdot s^2 + Dm \cdot s + Kb} \frac{1}{s} u = \frac{1}{Kb} u \quad (14)$$

When it is now assumed that $\theta 1 = \theta 2$, a relationship between the input y into the turning angle control unit 34 and the input u into the turning mechanism is expressed by y=u/Kb.

Therefore, in order to input the elastic torque component $(K0 \cdot \theta r)$ to the turning mechanism in the end-abutting impact mitigation control, it is only required to calculate a product obtained by multiplying the elastic torque component $(K0 \cdot \theta r)$ by a conversion coefficient 1/Kb as a steering angle correction value $\Delta\theta$ and correct the target steering angle $\theta sr0$ with the steering angle correction value $\Delta\theta$. As with the first embodiment, an inertia torque component $(\Delta J \cdot \alpha)$ may be added to the elastic torque component $(K0 \cdot \theta r)$ and the sum thereof may be input to the turning mechanism.

Figure 15:
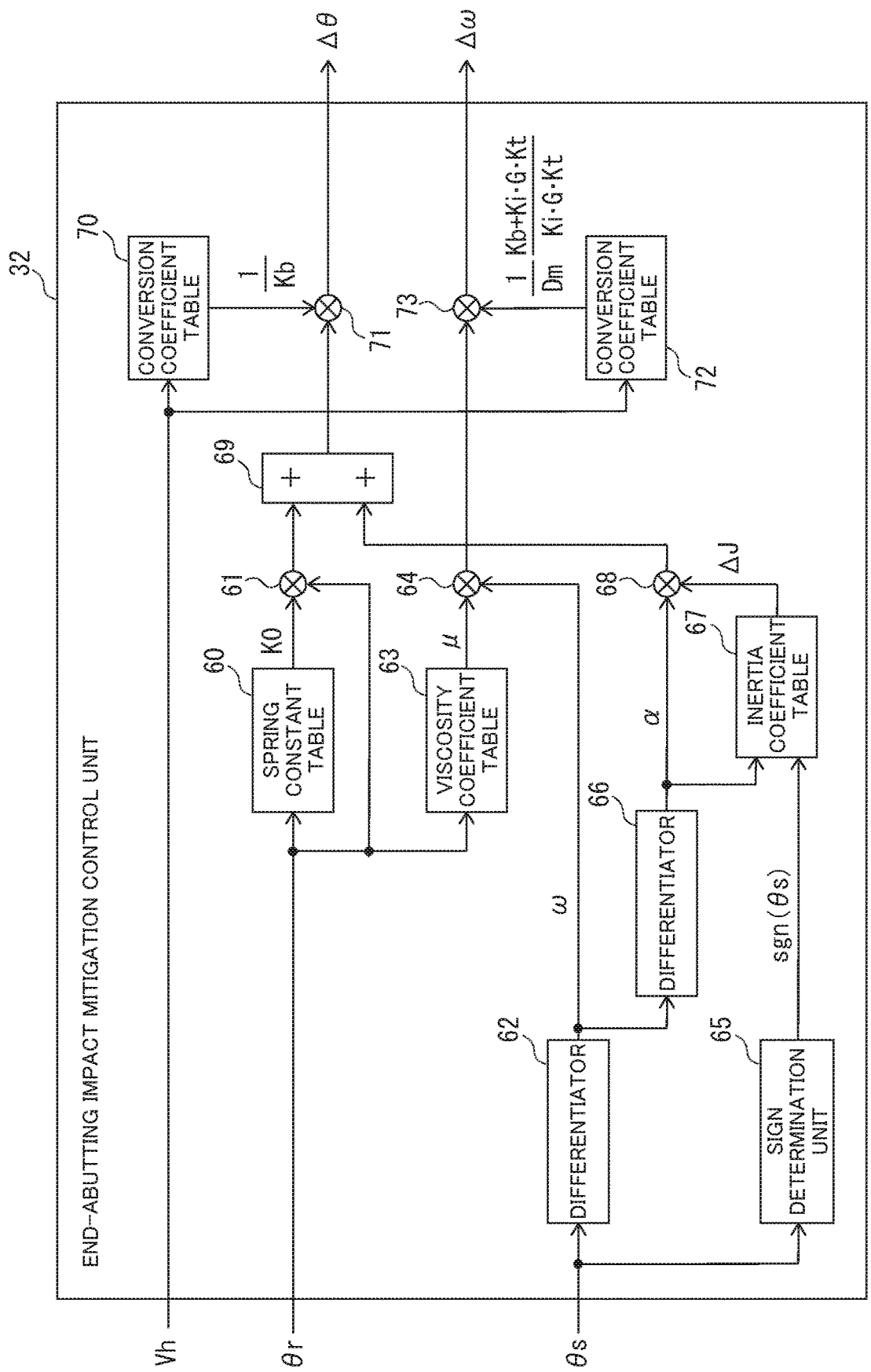
FIG. 15 is a block diagram illustrative of an example of a functional configuration of an end-abutting impact mitigation control unit of the second embodiment.

With reference to FIG. 15, a configuration of the end-abutting impact mitigation control unit 32 of the second embodiment will be described below. The end-abutting impact mitigation control unit 32 of the second embodiment has a configuration similar to that of the end-abutting impact mitigation control unit 32 of the first embodiment, and the same reference signs are assigned to the same constituent elements and overlapping description will be omitted.

The end-abutting impact mitigation control unit 32 of the second embodiment further includes a conversion coefficient table 72 and a multiplier 73.

The conversion coefficient table 72 outputs a conversion coefficient $(Kb+Ki \cdot G \cdot Kt)/(Dm \cdot Ki \cdot G \cdot Kt)$ for converting the viscous torque component ($\mu \cdot \omega$) output from a multiplier 64 to the angular velocity correction value $\Delta\omega$. Since, as described above, the spring constant Kb changes according to the vehicle speed Vh, the conversion coefficient table 72 may output the conversion coefficients $(Kb+Ki \cdot G \cdot Kt)/(Dm \cdot Ki \cdot G \cdot Kt)$ that changes according to the vehicle speed Vh.

When $Ki \cdot G \cdot Kt$ is sufficiently large compared with the spring constant Kb, the conversion coefficient table 72 may use (1/Dm), which is obtained by neglecting the spring constant Kb, as the conversion coefficient. Alternatively, an average value or an intermediate value between $(Kb+Ki \cdot G \cdot Kt)/(Dm \cdot Ki \cdot G \cdot Kt)$ and (1/Dm) may be used as the conversion coefficient.

Further, the conversion coefficient table 72 may switch the conversion coefficient between a conversion coefficient for the case of the driver returning the steering wheel and a conversion coefficient for the case of the driver further turning the steering wheel. For example, it may be configured such that, while the driver is returning the steering wheel, the conversion coefficient table 72 may output the conversion coefficient $(Kb+Ki \cdot G \cdot Kt)/(Dm \cdot Ki \cdot G \cdot Kt)$ with the spring constant Kb taken into consideration and, while the driver is further turning the steering wheel, the conversion coefficient table 72 may output the conversion coefficient (1/Dm).

The multiplier 73 multiplies the viscous torque component ($\mu \cdot \omega$) by the conversion coefficient (Kb+Ki·G·Kt)/(Dm-Ki·G·Kt) output from the conversion coefficient table 72 and thereby converts the viscous torque component ($\mu \cdot \omega$) to the angular velocity correction value $\Delta \omega$.

On the other hand, an adder 69 calculates a sum of the elastic torque component (K$\theta \cdot \theta$r) and the inertia torque component ($\Delta$J·$\alpha$), with the viscous torque component ($\mu \cdot \omega$) excluded from the turning torque Tm in the formula (3) above.

A multiplier 71 multiplies the sum (K$\theta \cdot \theta$r+$\Delta$J·$\alpha$) of the elastic torque component and the inertia torque component by the conversion coefficient 1/Kb output from the conversion coefficient table 70 and thereby converts the sum of the elastic torque component and the inertia torque component to the steering angle correction value $\Delta\theta$.

Note that the inertia torque component ($\Delta$J·$\alpha$) is not necessarily essential and a sign determination unit 65, a differentiator 66, an inertia coefficient table 67, and a multiplier 68 may be omitted.

The differentiator 62, a viscosity coefficient table 63, the multiplier 64, the conversion coefficient table 72, and the multiplier 73 are an example of an angular velocity correction value calculation unit described in the claims. The subtracter 82 is an example of a corrected target angular velocity calculation unit described in the claims. The differentiator 62, the viscosity coefficient table 63, and the multiplier 64 are an example of a viscous torque calculation unit described in the claims. The conversion coefficient table 72 and the multiplier 73 are an example of a second conversion unit described in the claims.

(Operation)

Figure 16:
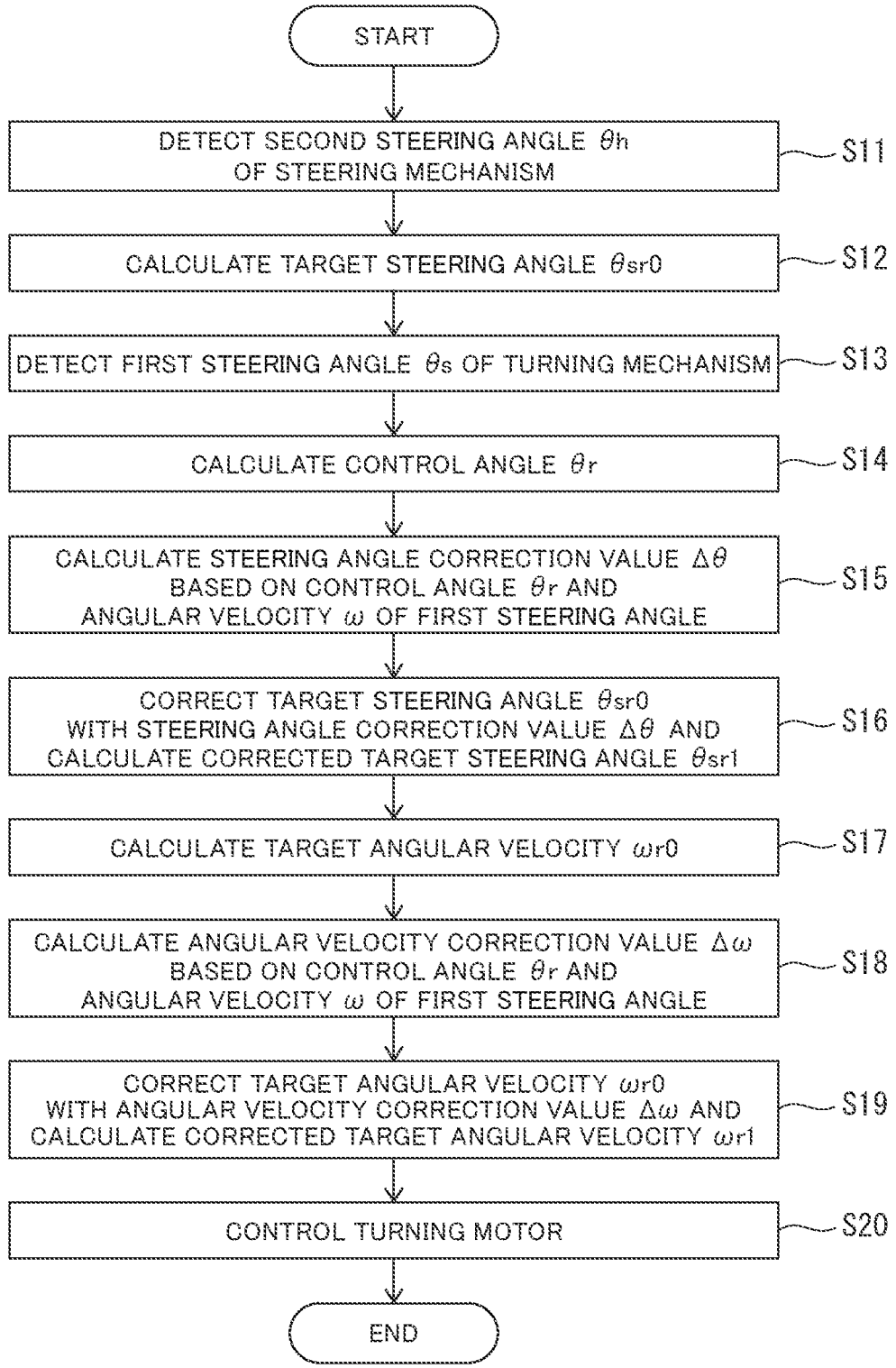
FIG. 16 is a flowchart of an example of a turning control method of the second embodiment.

Next, with reference to FIG. 16, a turning control method of the second embodiment will be described.

Processing in steps S11 to S16 are the same as steps S1 to S6 that were described with reference to FIG. 8.

In step S17, the target angular velocity calculation unit 81 multiplies deviation between the corrected target steering angle $\theta$sr1 and the actual first steering angle $\theta$s by the constant Kp and thereby calculates a target angular velocity $\omega$r0.

In step S18, the differentiator 62, the viscosity coefficient table 63, the multiplier 64, the conversion coefficient table 72, and the multiplier 73 calculate an angular velocity correction value $\Delta\omega$, based on the control angle $\theta$r and the angular velocity $\omega$ of the first steering angle $\theta$s.

In step S19, the subtracter 82 corrects the target angular velocity $\omega$r0 with the angular velocity correction value $\Delta\omega$ and thereby calculates a corrected target angular velocity $\omega$r1.

In step S20, the turning angle control unit 34 controls the turning motor 22 in such a way that the first steering angle $\theta$s coincides with the corrected target steering angle $\theta$sr1. In this step, the angular velocity control unit 85 of the turning angle control unit 34 controls the turning motor 22 in such a way that the angular velocity $\omega$ of the first steering angle $\theta$s coincides with the corrected target angular velocity $\omega$r1. Subsequently, the process terminates.

Advantageous Effects of Second Embodiment (1) The differentiator 62, the viscosity coefficient table 63, the multiplier 64, the conversion coefficient table 72, and the multiplier 73 calculate the angular velocity correction value $\Delta\omega$, based on the angular velocity $\omega$ of the first steering angle $\theta$s and the control angle $\theta$r.

The turning angle control unit 34 includes the target angular velocity calculation unit 81 that calculates the target angular velocity $\omega$r0, based on a difference between the corrected target steering angle $\theta$sr1 and the first steering angle $\theta$s, the subtracter 82 that corrects the target angular velocity $\omega$r0 with the angular velocity correction value $\Delta\omega$ and thereby calculates the corrected target angular velocity $\omega$r1, and the angular velocity control unit 85 that controls the turning motor 22 in such a way that the angular velocity $\omega$ coincides with the corrected target angular velocity $\omega$r1.

In the turning control device that performs turning angle control of bringing the first steering angle $\theta$s close to a target steering angle and angular velocity control of bringing the angular velocity $\omega$ close to a target angular velocity, this configuration enables the target steering angle to be corrected according to the first steering angle $\theta$s and the target angular velocity to be corrected according to the angular velocity $\omega$. Making the units of correction targets (that is, the target steering angle and the target angular velocity) the same as the units of correction amounts (that is, the steering angle correction value $\Delta\theta$ and the angular velocity correction value $\Delta\omega$) as described above causes handling of the steering angle correction value $\Delta\theta$ and the angular velocity correction value $\Delta\omega$ used for correction to be facilitated.

(2) The differentiator 62, the viscosity coefficient table 63, and the multiplier 64 calculate the viscous torque component ($\mu \cdot \omega$) to be exerted on the turning mechanism, based on the control angle $\theta$r and the angular velocity $\omega$. The conversion coefficient table 72 and the multiplier 73 convert the viscous torque component ($\mu \cdot \omega$) to the angular velocity correction value $\Delta\omega$.

This configuration enables the angular velocity correction value $\Delta\omega$ according to the angular velocity $\omega$ to be calculated based on the viscous torque component ($\mu \cdot \omega$).

(Variation)

It may be configured such that a steering angle gain Gs and a viscous torque component Tv are set in place of the viscous torque component ($\mu \cdot \omega$) as with the third variation and the fourth variation of the first embodiment and the product (Gs·Tv) of the steering angle gain Gs and the viscous torque component Tv is converted to the angular velocity correction value $\Delta\omega$.

For example, the end-abutting impact mitigation control unit 32 of the variation may include, in place of the spring constant table 60, the multipliers 61 and 64, and the viscosity coefficient table 63 in FIG. 15, an elastic torque component setting unit 200, a viscous torque component setting unit 201, a steering angle gain setting unit 202, and a multiplier 203, which were described with reference to FIG. 10 or 12.

The adder 69 calculates a sum of an elastic torque component Te that the elastic torque component setting unit 200 sets and the inertia torque component ($\Delta$J·$\alpha$).

The multiplier 71 multiplies the sum (Te+$\Delta$J·$\alpha$) of the elastic torque component and the inertia torque component by the conversion coefficient 1/Kb output from the conversion coefficient table 70 and thereby converts the sum of the elastic torque component and the inertia torque component to the steering angle correction value $\Delta\theta$.

The multiplier 73 multiplies the product (Gs·Tv) of the steering angle gain Gs and the viscous torque component Tv by the conversion coefficient (Kb+Ki·G·Kt)/(Dm·Ki·G·Kt) output from the conversion coefficient table 72 and thereby converts the product (Gs·Tv) to the angular velocity correction value $\Delta\omega$.

Third Embodiment

In the above-described end-abutting impact mitigation control, the larger the control angle $\theta$r becomes as the rack 5b comes close to a stroke end, the larger steering angle correction value Δθ is output.

When the steering angle correction value Δθ becomes large and the corrected target steering angle θsr1 becomes small, it becomes more difficult to increase the first steering angle θs to a maximum steering angle and, thus, there is a possibility that the minimum turning radius of the vehicle becomes large.

On the other hand, it can be conjectured that, when the driver applies large steering torque to the steering mechanism even when the rack 5b has come close to the vicinity of the stroke end, the driver attempts to turn the vehicle with the minimum turning radius.

When the turning velocity of the turning mechanism (that is, the angular velocity ω of the first steering angle θs) is sufficiently low, it is possible to reduce or avoid discomfort that the driver feels due to impact and hit sound (abnormal noise) caused by end-abutting.

In a third embodiment, steering torque that the driver applies is detected as reaction torque Th and a control angle θr is corrected according to the reaction torque Th and a steering angle correction value Δθ is thereby reduced. On this occasion, a correction amount of the control angle θr is limited lest the amount of reduction in the steering angle correction value Δθ become excessive and turning velocity of a turning mechanism become excessively fast.

Figure 17:
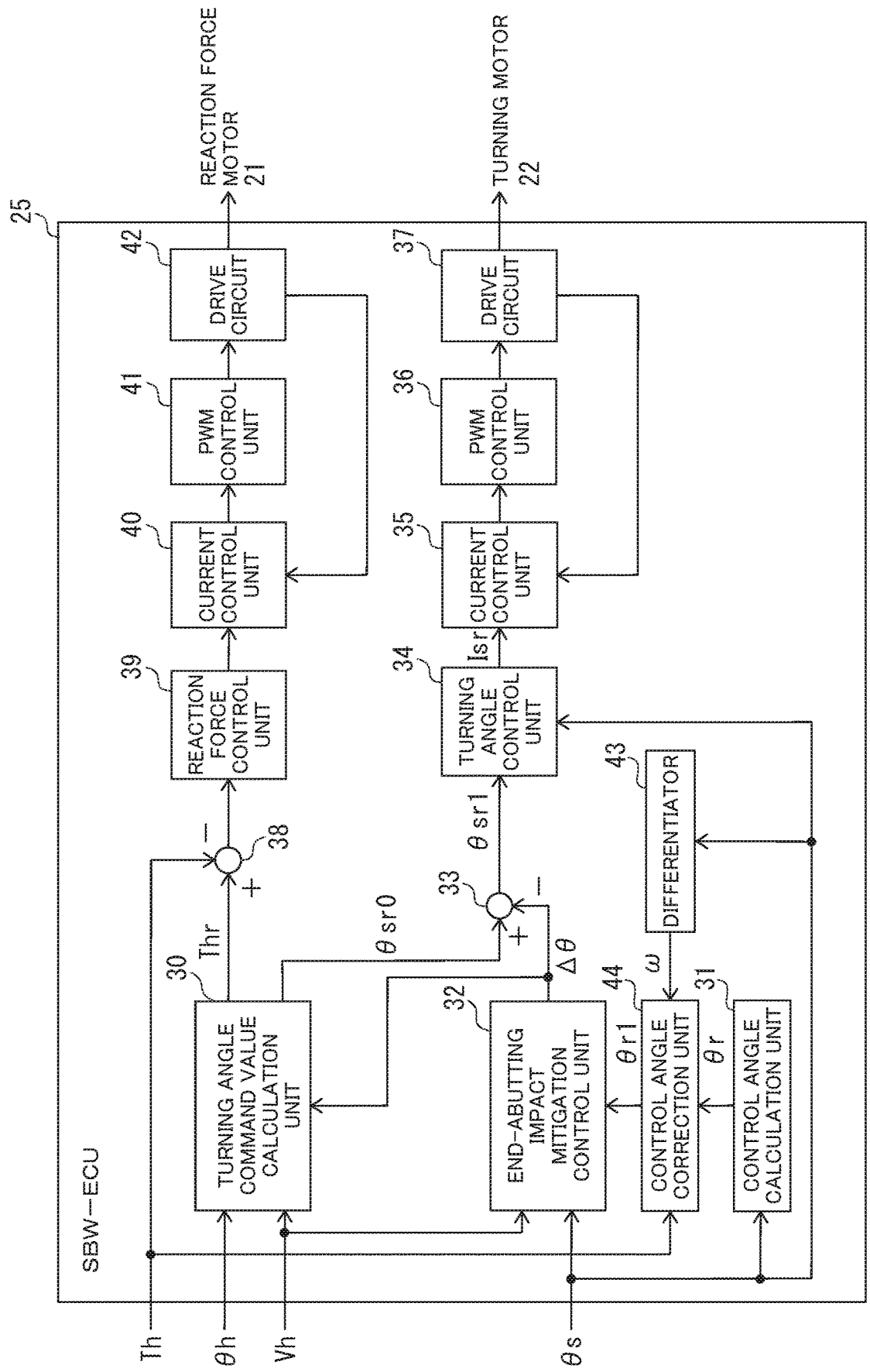
FIG. 17 is a block diagram illustrative of an example of a functional configuration of an SBW-ECU of a third embodiment.

FIG. 17 is now referred to. A functional configuration of an SBW-ECU 25 of the third embodiment has a configuration similar to the functional configuration of the SBW-ECU 25 of the first embodiment, and the same reference signs are assigned to the same constituent elements and overlapping description will be omitted.

The SBW-ECU 25 of the third embodiment includes a differentiator 43 and a control angle correction unit 44. The differentiator 43 differentiates a first steering angle θs and thereby calculates an angular velocity ω. The differentiator 43 may be made to also serve as a differentiator 62 of an end-abutting impact mitigation control unit 32.

The control angle correction unit 44 corrects a control angle θr that a control angle calculation unit 31 calculated, based on reaction torque Th that a torque sensor 10 detected and the angular velocity ω and thereby calculates a corrected control angle θr. Details of the control angle correction unit 44 will be described later.

The end-abutting impact mitigation control unit 32, using the corrected control angle θr in place of the control angle θr, calculates a steering angle correction value Δθ, based on the corrected control angle θr and the angular velocity ω of the first steering angle θs.

The differentiator 43 and the control angle correction unit 44 may be added to the configuration of the second embodiment. In this case, the end-abutting impact mitigation control unit 32, using the corrected control angle θr in place of the control angle θr, calculates a steering angle correction value Δθ and an angular velocity correction value Δω, based on the corrected control angle θr and the angular velocity ω of the first steering angle θs.

Details of the control angle correction unit 44 will be described below. When steering torque that the driver applies becomes large, the reaction torque Th that the torque sensor 10 detects becomes large. The control angle correction unit 44 calculates a correcting steering angle θt that increases as the reaction torque Th becomes larger and calculates a difference obtained by subtracting the correcting steering angle θt from the control angle θr as a corrected control angle θr.

Since this configuration causes the corrected control angle θr to become smaller as the steering torque that the driver applies increases, the steering angle correction value Δθ is reduced. As a result, a correction amount of a target steering angle θsr0 by end-abutting impact mitigation control is reduced.

On the other hand, when the correction amount by the end-abutting impact mitigation control is reduced and the angular velocity ω of the first steering angle θs is thereby increased, there is a possibility that impact and hit sound (abnormal noise) caused by end-abutting becomes large and the driver feels uncomfortable. Accordingly, the control angle correction unit 44 limits increase in the correcting steering angle θt, using a limiter or a rate limiter.

Figure 18:
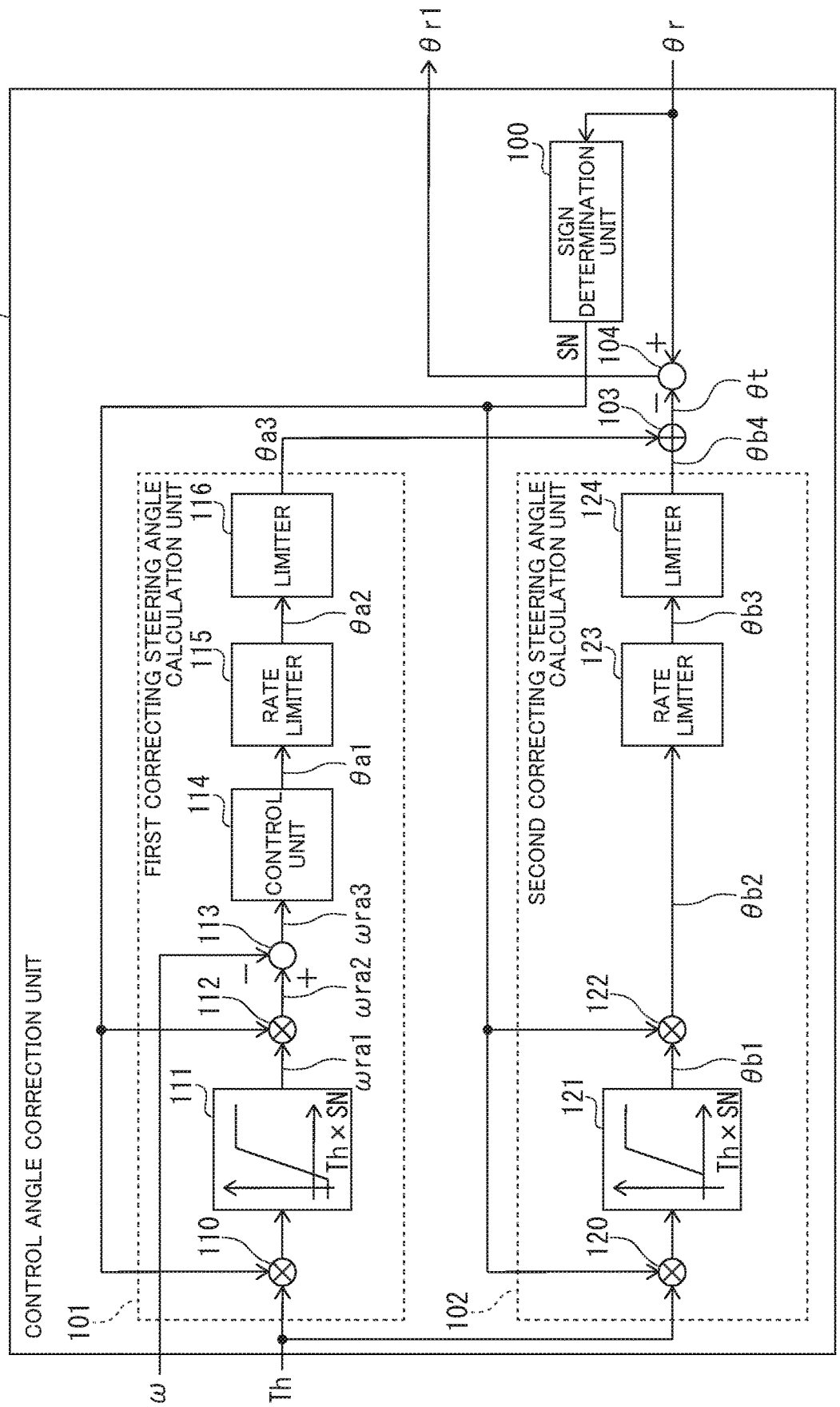
FIG. 18 is a block diagram illustrative of an example of a functional configuration of a control angle correction unit.

FIG. 18 is now referred to. The control angle correction unit 44 includes a sign determination unit 100, a first correcting steering angle calculation unit 101, a second correcting steering angle calculation unit 102, an adder 103, and a subtracter 104.

The sign determination unit 100 determines a positive/negative sign of the control angle θr and outputs a sign SN of the control angle θr.

The first correcting steering angle calculation unit 101 calculates a first correcting steering angle θa3 determined by feedback control, based on the sign SN, the reaction torque Th, and the angular velocity ω of the first steering angle θs. On the other hand, the second correcting steering angle calculation unit 102 calculates a second correcting steering angle θb4 determined by feedforward control, based on the sign SN and the reaction torque Th.

The adder 103 calculates a sum (θa3+θb4) of the first correcting steering angle θa3 and the second correcting steering angle θb4 as the correcting steering angle θt.

The subtracter 104 calculates a difference obtained by subtracting the correcting steering angle θt from the control angle θr as the corrected control angle θr1.

The first correcting steering angle calculation unit 101 includes multipliers 110 and 112, a target angular velocity calculation unit 111, a subtracter 113, a control unit 114, a rate limiter 115, and a limiter 116.

The multiplier 110 multiplies the reaction torque Th by the sign SN and thereby calculates normalized reaction torque (Th×SN). The sign of the normalized reaction torque (Th×SN) becomes positive at the time of the driver further turning the steering wheel and negative at the time of the driver returning the steering wheel.

Figure 19A:
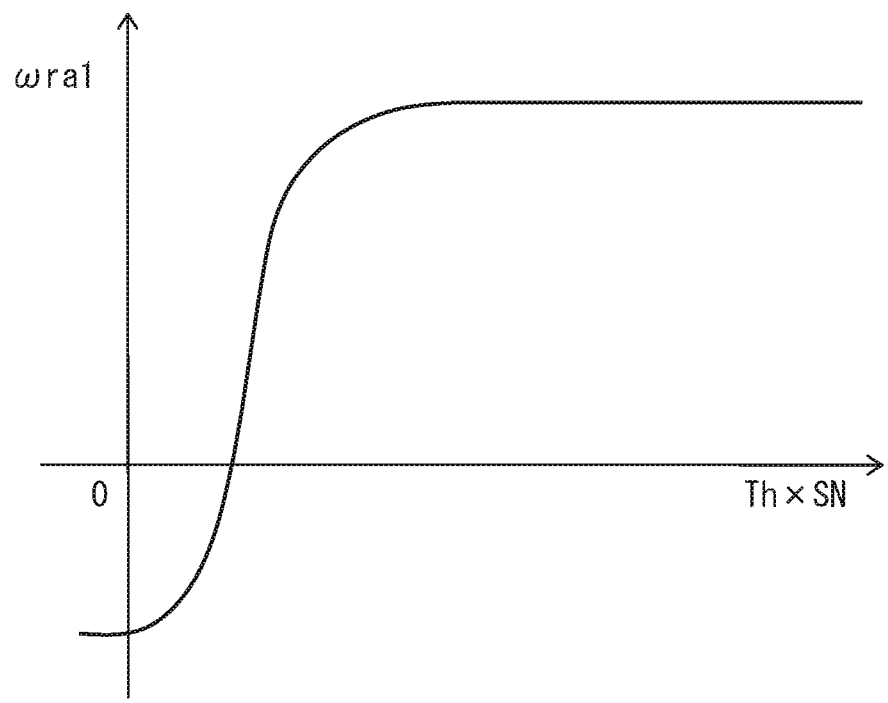
FIGS. 19A and 19B are a characteristic diagram of an example of target angular velocity that a target angular velocity calculation unit calculates and a characteristic diagram of an example of a correcting steering angle that a correcting steering angle calculation unit calculates, respectively.

The target angular velocity calculation unit 111 calculates a normalized target angular velocity ωra1 of the first steering angle θs according to the normalized reaction torque (Th×SN). Characteristics of the normalized target angular velocity ωra1 is illustrated in FIG. 19A. The normalized target angular velocity ωra1 is set in such a way as to increase as the normalized reaction torque (Th×SN) becomes larger. When the normalized reaction torque (Th×SN) is large, that is, in the case of steering around a rack end, the normalized target angular velocity ωra1 may be set in such a way as to asymptotically approach a steering velocity (angular velocity) at which the driver generally steers the steering wheel. When the reaction torque Th is substantially 0, that is, when no steering torque is applied (for example, the driver takes his/her hands off a steering wheel 1), the normalized target angular velocity ωra1 becomes negative because the steering wheel 1 is returned in a direction toward the neutral position due to road surface reaction force.

The multiplier 112 multiplies the normalized target angular velocity ωra1 by the sign SN and thereby calculates a target angular velocity ωra2 that has an actual sign. The subtracter 113 calculates a deviation ωra3 between the angular velocity ω and the target angular velocity ωra2.

The control unit 114 calculates a correcting steering angle θa1 by performing at least one of P (proportional) control, I (integral) control, and D (differential) control on the deviation ωra3.

The rate limiter 115 limits a time rate of change of the correcting steering angle θa1. The rate limiter 115 outputs correcting steering angle θa2 obtained by limiting the time rate of change of the correcting steering angle θa1.

The limiter 116 limits the correcting steering angle θa2, using a limit value. The limiter 116 outputs the first correcting steering angle θa3 obtained by limiting the correcting steering angle θa2.

For example, a limit value for limiting positive correcting steering angle θa2 is set to be a positive value, and the limit value may be set in such a way as to gradually increase as the positive correcting steering angle θa2 becomes larger. In addition, a limit value for limiting negative correcting steering angle θa2 is set to be a negative value, and the limit value may be set in such a way as to gradually decrease (that is, in such a way that the absolute value of the limit value increases) as the negative correcting steering angle θa2 becomes smaller (that is, as the absolute value of the correcting steering angle θa2 becomes smaller).

The second correcting steering angle calculation unit 102 includes multipliers 120 and 122, a correcting steering angle calculation unit 121, a rate limiter 123, and a limiter 124.

The multiplier 120 multiplies the reaction torque Th by the sign SN and thereby calculates normalized reaction torque (Th×SN).

The correcting steering angle calculation unit 121 calculates a normalized correcting steering angle θb1 according to the normalized reaction torque (Th×SN).

The multiplier 122 multiplies the normalized correcting steering angle θb1 by the sign SN and thereby calculates a correcting steering angle θb2 that has an actual sign.

Figure 19B:
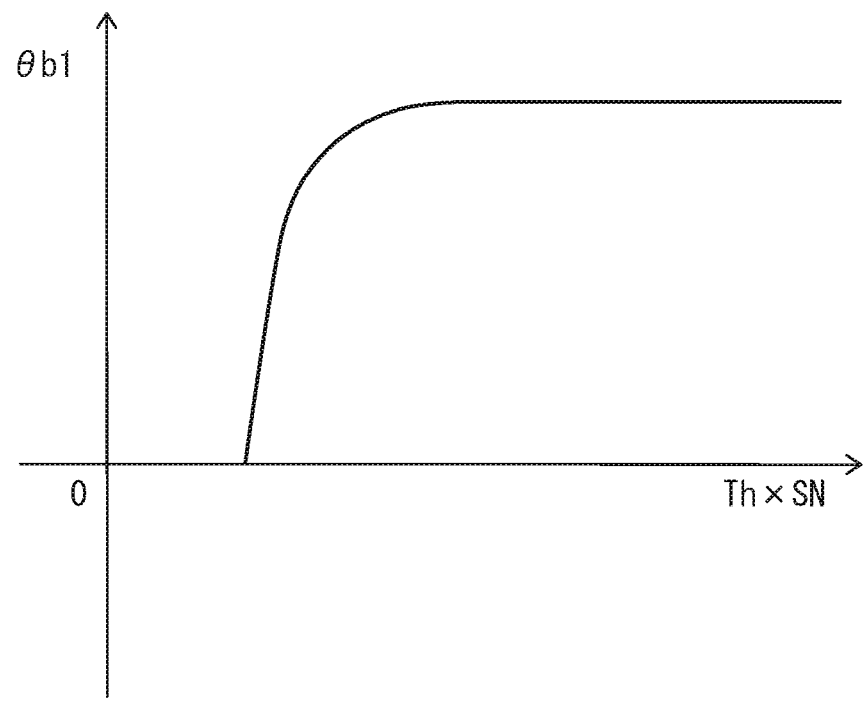

Characteristics of the normalized correcting steering angle θb1 is illustrated in FIG. 19B. The normalized correcting steering angle θb1 is set in such a way as to increase as the normalized reaction torque (Th×SN) becomes larger.

The normalized correcting steering angle θb1 is also set in such a way as to be constantly positive. Thus, the positive/negative sign of the correcting steering angle θb2 coincides with the positive/negative sign of the control angle θr.

Note that, as with the characteristics of the normalized target angular velocity ωra1 in FIG. 19A, characteristics of the normalized correcting steering angle θb1 may be set to be negative in a region in which the normalized reaction torque (Th×SN) is comparatively small. In this case, the output of the limiter 124 at a succeeding stage may be limited to 0 in a region in which the normalized correcting steering angle θb1 is negative.

The rate limiter 123 limits a time rate of change of the correcting steering angle θb2. The rate limiter 123 outputs correcting steering angle θb3 obtained by limiting the time rate of change of the correcting steering angle θb2.

The limiter 124 limits the correcting steering angle θb3, using a limit value. The limiter 124 outputs the second correcting steering angle θb4 obtained by limiting the correcting steering angle θb3.

For example, when the control angle θr and the correcting steering angle θb3 are positive, the limit value is set to be a positive limit value that gradually increases as the correcting steering angle θb3 becomes larger.

When the control angle θr and the correcting steering angle θb3 are negative, the limit value may be set to be a negative limit value that gradually decreases (that is, the absolute value of the limit value gradually increases) as the correcting steering angle θb3 becomes smaller (that is, as the absolute value of the correcting steering angle θb3 becomes smaller).

The control angle correction unit 44 is an example of a steering angular displacement correction unit described in the claims.

Advantageous Effect of Third Embodiment

The control angle correction unit 44 corrects the control angle θr that the control angle calculation unit 31 calculated, based on the reaction torque Th that the torque sensor 10 detected.

When the driver applies a large steering torque to the steering mechanism (for example, the driver attempts to turn the vehicle with the minimum turning radius), this configuration enables correction by end-abutting impact mitigation to be reduced and the first steering angle θs to be increased to a maximum steering angle. In other words, it is possible to suppress influence of the minimum turning radius becoming large. This capability enables end-abutting impact mitigation and suppression of influence on the turning radius to be achieved at a high level.

(First Variation)

Figure 20:
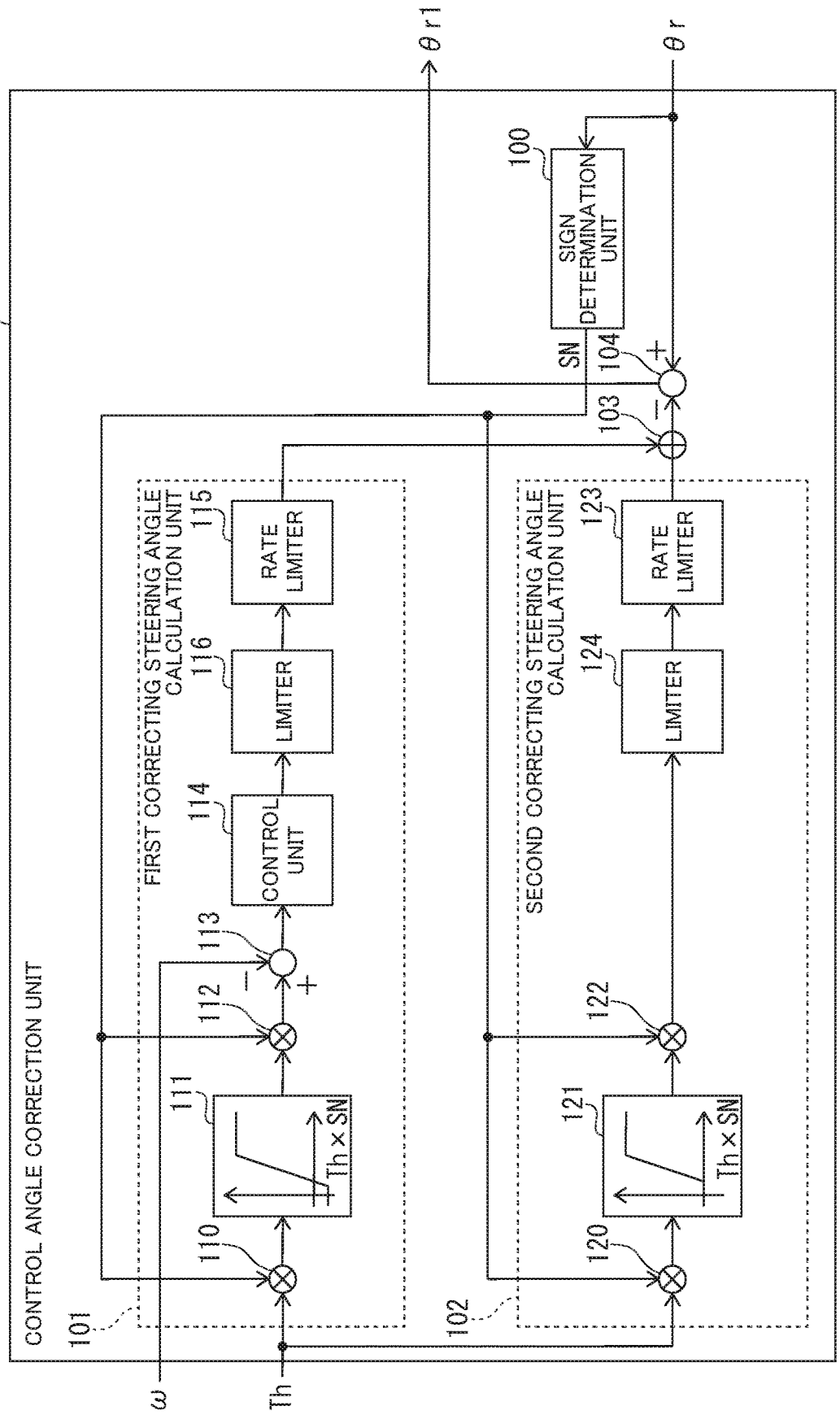
FIG. 20 is a block diagram illustrative of a functional configuration of a control angle correction unit of a first variation.

FIG. 20 is now referred to. The rate limiter 115 may be disposed at the succeeding stage to the limiter 116, and the limiter 116 may be disposed at the succeeding stage to the control unit 114 and at the preceding stage to the rate limiter 115. Similarly, the rate limiter 123 may be disposed at the succeeding stage to the limiter 124, and the limiter 124 may be disposed at the succeeding stage to the multiplier 122 and at the preceding stage to the rate limiter 123.

(Second Variation)

Figure 21:
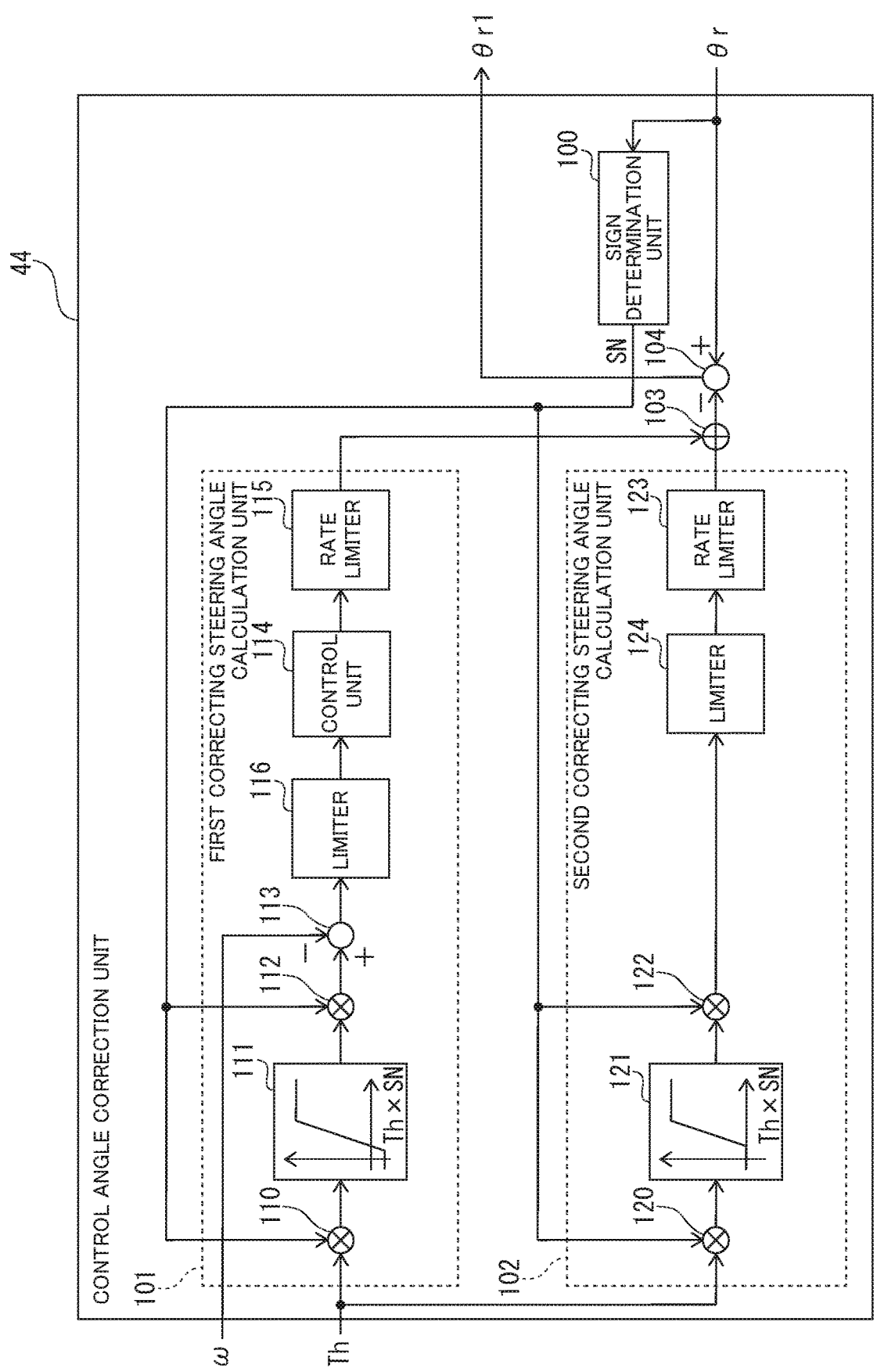
FIG. 21 is a block diagram illustrative of a functional configuration of a control angle correction unit of a second variation.

FIG. 21 is now referred to. Further, the control unit 114 may be disposed at the succeeding stage to the limiter 116 and at the preceding stage to the rate limiter 115, and the limiter 116 may be disposed at the succeeding stage to the subtracter 113 and at the preceding stage to the control unit 114.

(Third Variation)

Figure 22:
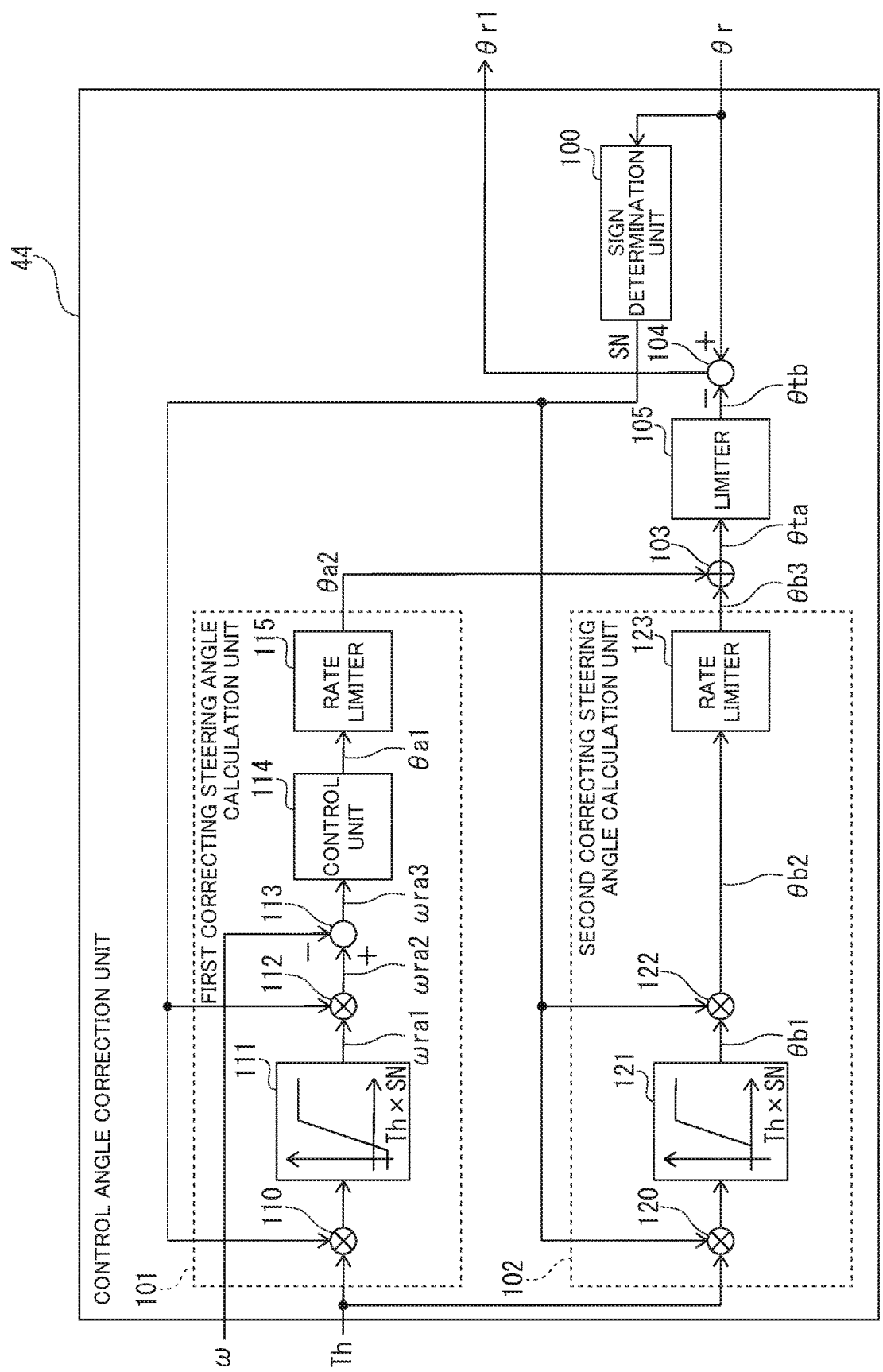
FIG. 22 is a block diagram illustrative of a functional configuration of a control angle correction unit of a third variation.

FIG. 22 is now referred to. The limiter 116 of the first correcting steering angle calculation unit 101 and the limiter 124 of the second correcting steering angle calculation unit 102 may be omitted, and a limiter 105 may be disposed at the succeeding stage to the adder 103.

The adder 103 calculates a sum (θa2+θb3) of the first correcting steering angle θa2 and the second correcting steering angle θb3 as a correcting steering angle θta, and the limiter 105 limits the correcting steering angle θta, using a limit value. The subtracter 104 calculates a difference obtained by subtracting a correcting steering angle θtb that is obtained by limiting the correcting steering angle θta from the control angle θr as a corrected control angle θr1.

(Fourth Variation)

A spring constant table 60 (see FIG. 5) may output a spring constant K0 according to the corrected control angle θr1, and a viscosity coefficient table 63 may output a viscosity coefficient μ depending on the control angle θr as with the first and second embodiments.

(Fifth Variation)

Either the first correcting steering angle calculation unit 101 or the second correcting steering angle calculation unit 102 may be omitted.

(Sixth Variation)

Figure 23A:
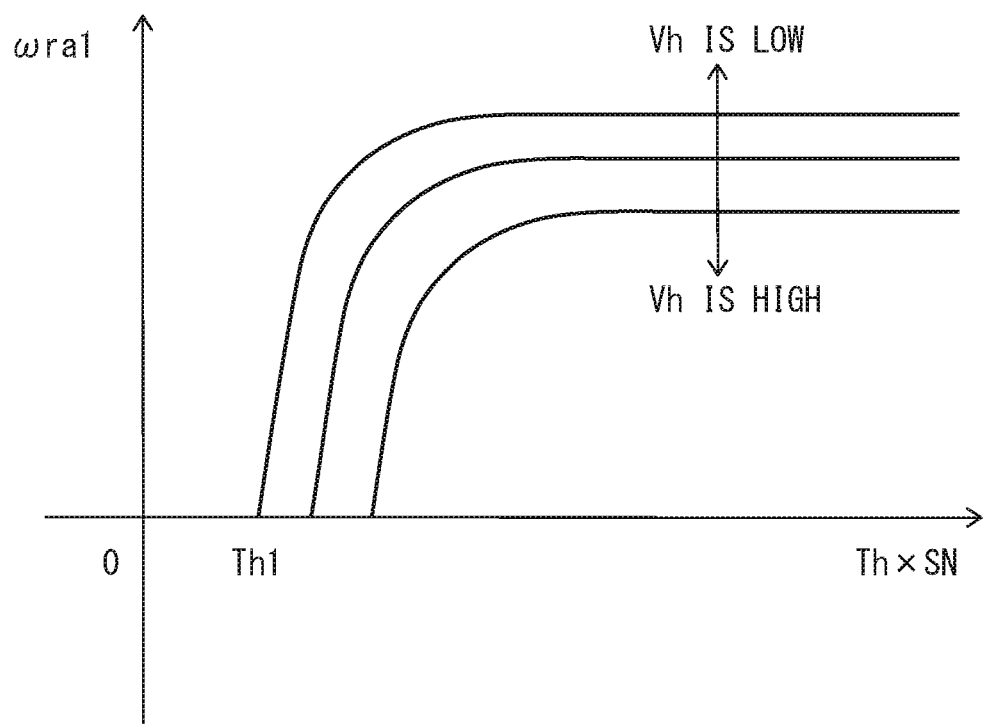
FIGS. 23A and 23B are characteristic diagrams of examples of target steering angular velocity and a correcting steering angle of a control angle correction unit of a sixth variation, respectively.

The target angular velocity calculation unit 111 may calculate a normalized target angular velocity ωra1 according to vehicle speed Vh and the normalized reaction torque (Th×SN) The target angular velocity calculation unit 111 may be decreased the normalized target angular velocity ωra1 as the vehicle speed Vh becomes higher, as illustrated in, for example, FIG. 23A.

Figure 23B:
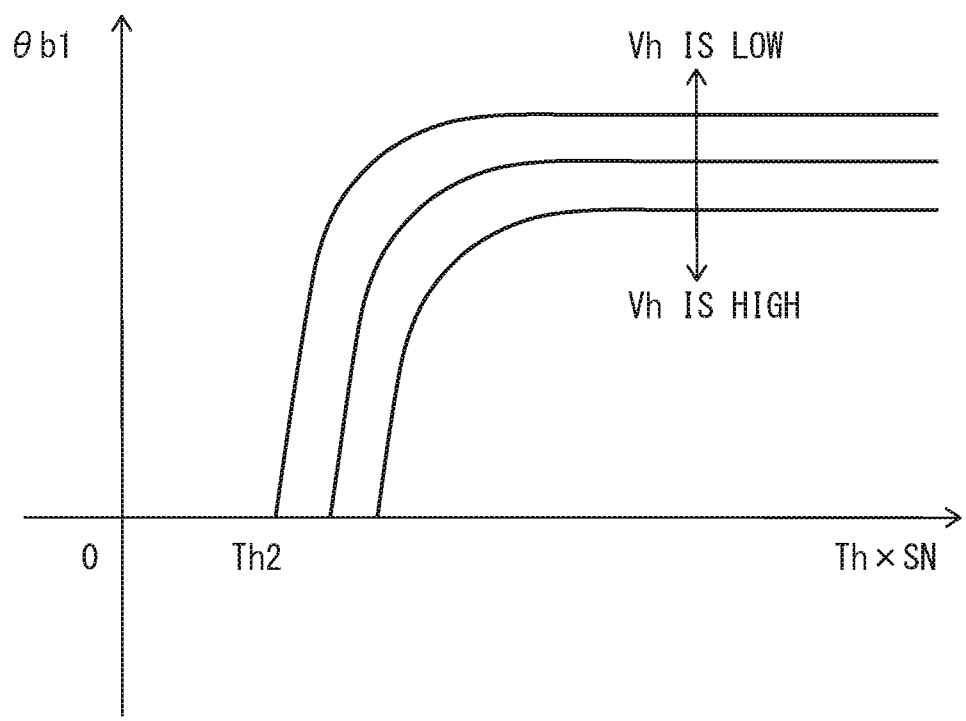

In addition, the correcting steering angle calculation unit 121 may calculate a normalized correcting steering angle θb1 according to the vehicle speed Vh and the normalized reaction torque (Th×SN). The correcting steering angle calculation unit 121 may be decreased the normalized correcting steering angle θb1 as the vehicle speed Vh becomes higher, as illustrated in, for example, FIG. 23B.

In addition, the normalized target angular velocity ωra1 and the normalized correcting steering angle θb1 may be increased as the vehicle speed Vh becomes higher.

(Seventh Variation)

Figure 24:
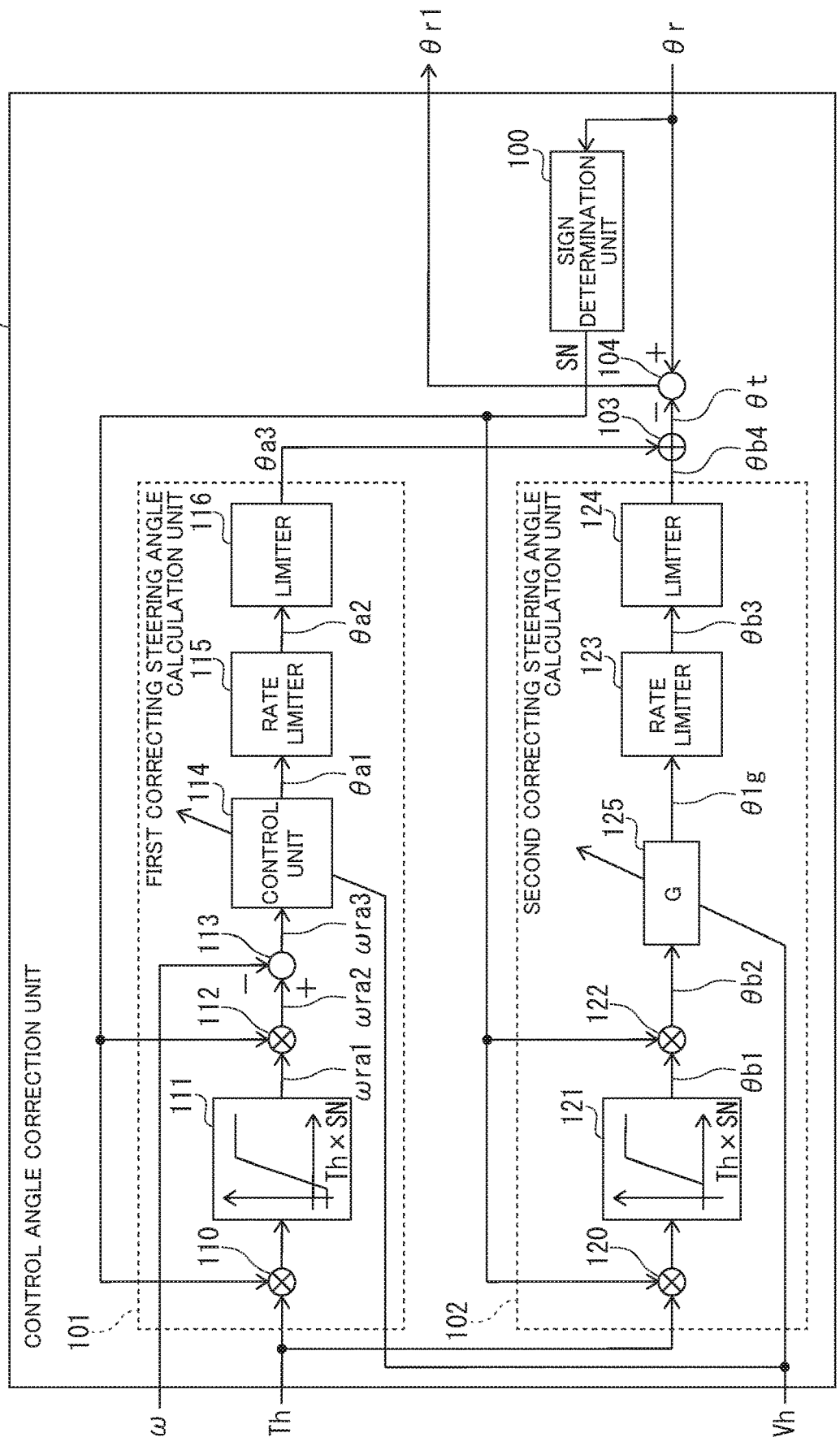
FIG. 24 is a block diagram illustrative of a functional configuration of a control angle correction unit of a seventh variation.

FIG. 24 is now referred to. A gain multiplication unit 125 that multiplies a correcting steering angle by a gain G depending on the vehicle speed Vh may be disposed in the second correcting steering angle calculation unit 102. For example, the gain multiplication unit 125 may be disposed at the succeeding stage to the multiplier 122 and at the preceding stage to the rate limiter 123. In addition, a proportional gain of the P (proportional) control, an integral gain of the I (integral) control, or a differential gain of the D (differential) control in the control unit 114 of the first correcting steering angle calculation unit 101 may be changed according to the vehicle speed Vh.

For example, the gains may be decreased as the vehicle speed Vh becomes higher. In addition, the gains may be increased as the vehicle speed Vh becomes higher.

Further, the gains may be changed according to the control angle θr. For example, each gain may be set to be 0 in a range in which the control angle θr is less than a predetermined threshold value and greater than 0 in a range in which the control angle θr is equal to or greater than the predetermined threshold value.

REFERENCE SIGNS LIST

1 Steering wheel
2 Steering shaft
3, 23 Reduction gear
4a, 4b Universal joint
5 Pinion rack mechanism
5a Pinion
5b Rack
6a, 6b Tie rod
7a, 7b Hub unit
8L, 8R Steered wheel
10 Torque sensor
11 Ignition (IGN) key
12 Vehicle speed sensor
13 Battery
14 Steering angle sensor
20 Backup clutch
21 Reaction force motor
22 Turning motor
24 Pinion
25 SBW-ECU
26 Turning angle sensor
30 Turning angle command value calculation unit
31 Control angle calculation unit
32 Steering angle correction value calculation unit
33, 38, 80, 82, 86, 90, 104, 113 Subtracter
34 Turning angle control unit
35, 40 Current control unit
36, 41 PWM control unit
37, 42 Drive circuit
39 Reaction force control unit
43, 51, 62, 66, 83 Differentiator
44 Control angle correction unit
50 Basic reaction torque calculation unit
52 damping coefficient table
53, 55, 58, 61, 64, 68, 71, 73, 110, 112, 120, 122, 203 Multiplier
54 Reaction force correction coefficient table
56, 69, 91, 103 Adder
57 Turning ratio table
60 Spring constant table
63 Viscosity coefficient table
65, 100 Sign determination unit
67 Inertia coefficient table
70, 72 Conversion coefficient table
81 Target angular velocity calculation unit
85 Angular velocity control unit
87, 89, 125 Gain multiplication unit
88 Integrator
101 First correcting steering angle calculation unit
102 Second correcting steering angle calculation unit
105, 116, 124 Limiter
111 Target angular velocity calculation unit
114 Control unit
115, 123 Rate limiter
121 Correcting steering angle calculation unit
200 Elastic torque component setting unit
201 Viscous torque component setting unit
202 Steering angle gain setting unit

The invention claimed is:

1. A turning control device comprising:
    a first steering angle detection unit configured to detect a first steering angle of a turning mechanism;
    a first actuator configured to drive the turning mechanism;
    a second steering angle detection unit configured to detect a second steering angle of a steering mechanism;
    a target steering angle calculation unit configured to calculate a target steering angle of the turning mechanism, based on at least the second steering angle;
    a steering angular displacement calculation unit configured to, when a third steering angle, the third steering angle being either the first steering angle or the second steering angle, is in an angular range from a maximum steering angle that the third steering angle can take to a first threshold steering angle, calculate a steering angular displacement of the third steering angle with the first threshold steering angle used as a reference;
    a steering angle correction value calculation unit configured to calculate a steering angle correction value according to at least the steering angular displacement;
    a corrected target steering angle calculation unit configured to, by correcting the target steering angle with the steering angle correction value, calculate a corrected target steering angle; and
    a steering angle control unit configured to control the first actuator in such a way that the first steering angle coincides with the corrected target steering angle.

2. The turning control device according to claim 1, wherein the steering angle correction value calculation unit includes:
    a turning torque calculation unit configured to calculate a torque including elastic torque based on the steering angular displacement as turning torque to be exerted on the turning mechanism; and
    a first conversion unit configured to convert the turning torque to the steering angle correction value.

3. The turning control device according to claim 1, wherein
the steering angle correction value calculation unit includes:
    a turning torque calculation unit configured to calculate a torque including at least either elastic torque based on the steering angular displacement or viscous torque based on angular velocity of the first steering angle and the steering angular displacement as turning torque to be exerted on the turning mechanism; and
    a first conversion unit configured to convert the turning torque to the steering angle correction value.

4. The turning control device according to claim 3, wherein
the turning torque calculation unit, by adding inertia torque based on angular acceleration of the first steering angle to at least either the elastic torque or the viscous torque, calculates the turning torque.

5. The turning control device according to claim 3, wherein
the turning torque calculation unit calculates the viscous torque, the viscous torque nonlinearly changing with respect to angular velocity of the first steering angle.

6. The turning control device according to claim 2, wherein
the first conversion unit, by converting the turning torque, using a coefficient depending on vehicle speed, calculates the steering angle correction value.

7. The turning control device according to claim 1 comprising
an angular velocity correction value calculation unit configured to calculate an angular velocity correction value, based on angular velocity of the first steering angle and the steering angular displacement, wherein
the steering angle control unit includes:
    a target angular velocity calculation unit configured to calculate a target angular velocity of the first steering angle, based on a difference between the corrected target steering angle and the first steering angle;
    a corrected target angular velocity calculation unit configured to, by correcting the target angular velocity with the angular velocity correction value, calculate a corrected target angular velocity; and
an angular velocity control unit configured to control the first actuator in such a way that the angular velocity coincides with the corrected target angular velocity.

8. The turning control device according to claim 7, wherein
the angular velocity correction value calculation unit includes:
    a viscous torque calculation unit configured to calculate a viscous torque to be exerted on the turning mechanism, based on the steering angular displacement and the angular velocity; and
    a second conversion unit configured to convert the viscous torque to the angular velocity correction value.

9. The turning control device according to claim 8, wherein
the viscous torque calculation unit calculates the viscous torque, the viscous torque nonlinearly changing with respect to angular velocity of the first steering angle.

10. The turning control device according to claim 8, wherein
the second conversion unit
    converts the viscous torque to the angular velocity correction value, using a coefficient depending on at least either vehicle speed or whether a steering state is a state of a driver further turning a steering wheel or a state of the driver returning the steering wheel.

11. The turning control device according to claim 1 further comprising:
    a second actuator configured to apply reaction torque to the steering mechanism;
    a reaction torque detection unit configured to detect the reaction torque of the steering mechanism; and
    a steering angular displacement correction unit configured to correct the steering angular displacement calculated by the steering angular displacement calculation unit according to the reaction torque, wherein
the steering angle correction value calculation unit calculates the steering angle correction value, based on the steering angular displacement corrected by the steering angular displacement correction unit.

12. The turning control device according to claim 1 comprising:
    a target reaction force calculation unit configured to calculate a target reaction force to be applied to the steering mechanism, based on at least the second steering angle;
    a target reaction force correction unit configured to correct the target reaction force according to the steering angle correction value; and
    a second actuator configured to apply reaction torque to the steering mechanism according to the target reaction force corrected by the target reaction force correction unit.

13. The turning control device according to claim 1, wherein
when the third steering angle exceeds a second threshold steering angle, the second threshold steering angle being larger than the first threshold steering angle, the steering angular displacement calculation unit alters the first threshold steering angle according to a difference between the third steering angle and the second threshold steering angle.

* * * * *